United States Patent
Evoy

(10) Patent No.: US 7,203,868 B1
(45) Date of Patent: Apr. 10, 2007

(54) DYNAMIC MONITORING OF RESOURCES USING SNAPSHOTS OF SYSTEM STATES

(75) Inventor: Jerry Michael Evoy, San Dimas, CA (US)

(73) Assignee: Unisys Corporation, Blue Bell, PA (US)

( * ) Notice: Subject to any disclaimer, the term of this patent is extended or adjusted under 35 U.S.C. 154(b) by 238 days.

(21) Appl. No.: 10/723,912

(22) Filed: Nov. 26, 2003

Related U.S. Application Data

(63) Continuation of application No. 10/615,856, filed on Jul. 8, 2003, which is a continuation-in-part of application No. 09/448,232, filed on Nov. 24, 1999, now Pat. No. 6,591,377.

(60) Provisional application No. 60/455,622, filed on Mar. 18, 2003.

(51) Int. Cl.
*G06F 11/00* (2006.01)
(52) U.S. Cl. .............................. 714/39; 714/37; 714/47
(58) Field of Classification Search .................. 714/37, 714/39
See application file for complete search history.

(56) References Cited

U.S. PATENT DOCUMENTS

| | | | | |
|---|---|---|---|---|
| 5,133,075 A | * | 7/1992 | Risch | 707/201 |
| 5,668,944 A | * | 9/1997 | Berry | 714/47 |
| 5,758,071 A | * | 5/1998 | Burgess et al. | 709/220 |
| 6,240,511 B1 | * | 5/2001 | Blumenau et al. | 713/1 |
| 6,470,385 B1 | * | 10/2002 | Nakashima et al. | 709/224 |
| 6,718,486 B1 | * | 4/2004 | Roselli et al. | 714/41 |
| 6,826,715 B1 | * | 11/2004 | Meyer et al. | 714/37 |
| 6,883,120 B1 | * | 4/2005 | Banga | 714/47 |
| 2004/0078723 A1 | * | 4/2004 | Gross et al. | 714/47 |

OTHER PUBLICATIONS

Microsoft Press Computer Dictionary Third Edition, "COM", Microsoft Press, 1997, p. 100.*

* cited by examiner

*Primary Examiner*—Gabriel L. Chu
(74) *Attorney, Agent, or Firm*—Phuong-Quan Hoang; Mark T. Starr; Richard J. Gregson

(57) ABSTRACT

One embodiment of the invention is a method for dynamically monitoring resources. A request of a user to monitor at least one specified resource is sent to a monitor request module. Using the monitor request module, at least one monitor is created to monitor the specified resource.

33 Claims, 19 Drawing Sheets

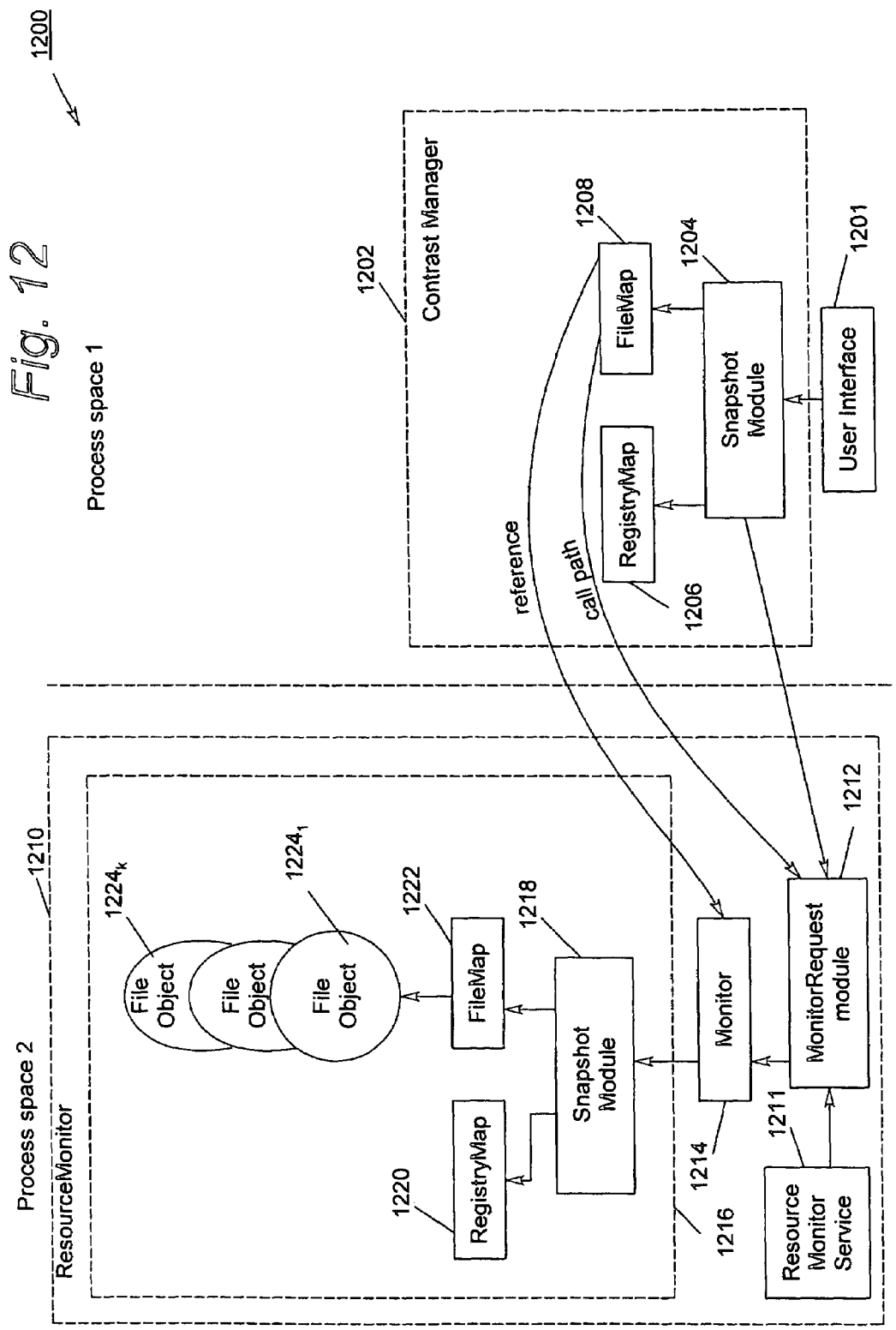

DYNAMIC MONITORING OF RESOURCES USING SNAPSHOTS OF SYSTEM STATES

CROSS-REFERENCE TO RELATED APPLICATIONS

This application is a continuation application of Ser. No. 10/615,856 entitled "Dynamic Monitoring of System Resources" filed on Jul. 8, 2003, the content of which is herein incorporated by reference. Ser. No. 10/615,856 is a continuation-in-part application of Ser. No. 09/448,232 entitled "A Method For Comparing System States At Different Points In Time" filed on Nov. 24, 1999 now U.S. Pat. No. 6,591,377. This application also claims benefit of the provisional application Ser. No. 60/455,622 entitled "Dynamic Monitoring of Resources" filed on Mar. 18, 2003, the contents of which are herein incorporated by reference.

BACKGROUND OF THE INVENTION

1. Field of the Invention

The present invention relates in general to the field of monitoring system resources, and in particular to methods and systems for monitoring system resources in real-time in an object-oriented environment.

2. Description of Related Art

With increasing complexity of administering computer systems today, it is desirable to detect changes in system states of a complex computer system in real-time and log the changes. System state is defined as a run-time state of system resources at a particular instant in time.

The resources of a computer system that may be of interest at run-time are its hardware, file systems, processes running on the system and its registry. The term hardware of a computer system refers to objects that are tangible such as disks, disk drives, display screens, keyboards, printers, boards, and chips. File subsystem refers to a system that an operating system or a program uses to organize and keep track of files. For example, a hierarchical file subsystem is one that uses directories to organize files into a tree structure. A process is a program being executed by a computer system and the term is also used as a synonym for a task. A process performs some useful operations on data. Typically, an operating system is capable of running several processes at the same time. Hence, at any given time there could be one or more processes running on a computer system. A registry is a database used by an operating system to store configuration information. For Windows operating system, the Registry comprises the following major sections:

HKEY_Classes_Root—file associations and OLE information
HKEY_Current_User—all preferences set for current user
HKEY_User—all the current user information for each user of the system
HKEY_Local_Machine—settings for hardware, operating system, and installed applications
HKEY_Current_Configuration—settings for the display and printers Most Windows applications write data to the Registry, at least during installation. A registry can be edited directly by using the Registry Editor provided with the operating system. However, great care must be taken during editing the Registry because errors in the Registry could disable a computer system.

Changes to any of these components can result in a change in system state.

As the Windows NT operating system is increasingly becoming an enterprise wide operating system, a larger number of system administrators need methods that can held them diagnose and solve problems in a shorter period of time. In particular, there is a need for a method that can monitor in real-time specified resources of a computer system.

BRIEF DESCRIPTION OF THE DRAWINGS

The invention may best be understood by referring to the following description and accompanying drawings that are used to illustrate embodiments of the invention. In the drawings:

FIG. 12 is a block diagram illustrating a system 1200 comprising a second embodiment 1210 of the Resource Monitor system and a Contrast Manager system 1202.

SUMMARY OF THE INVENTION

An embodiment of the invention is a method for dynamically monitoring resources. A request of a user to monitor at least one specified resource is sent to a monitor request module. Using the monitor request module, at least one monitor is created to monitor the specified resource.

DETAILED DESCRIPTION

For ease of understanding and clarity, the terms that will be used hereinafter are defined as follows.

An object represents an entity. An object has properties which include all the attributes of the entity represented by the object, and may also have procedures (also called methods). Procedures may be implemented as executable code.

A snapshot is a collection of objects representing the system states at a point in time. A snapshot may comprise several collections of objects, with the objects belonging to the same collection being of the same type. The collections of objects may include a collection of file objects, a collection of registry objects, a collection of process objects, a collection of hardware objects, and a collection of certification objects.

A file object is an object representing a state of a file at a point in time. The state of a file includes all the attributes of the file.

A registry object is an object representing a registry key value. A registry object has attributes that include the two attributes of a registry key, which are the value name and the actual value.

A process object is an object representing a process.

A hardware object is an object representing a hardware item.

A certification object is an object representing a system resource that has a certification status (such as version). The collection of certification objects provides information regarding certification status of the system.

There are two main embodiments of the Resource Monitor of the present invention. The first embodiment can be used as a stand-alone system for real-time monitoring of specified system resources using snapshots of the specified system resources. The second embodiment of the Resource Monitor is used in conjunction with the Contrast Manager system of the present invention for real-time monitoring of specified system resources. In the second embodiment, the snapshots are created by an instantiation of the Contrast Manager.

Figure 1:
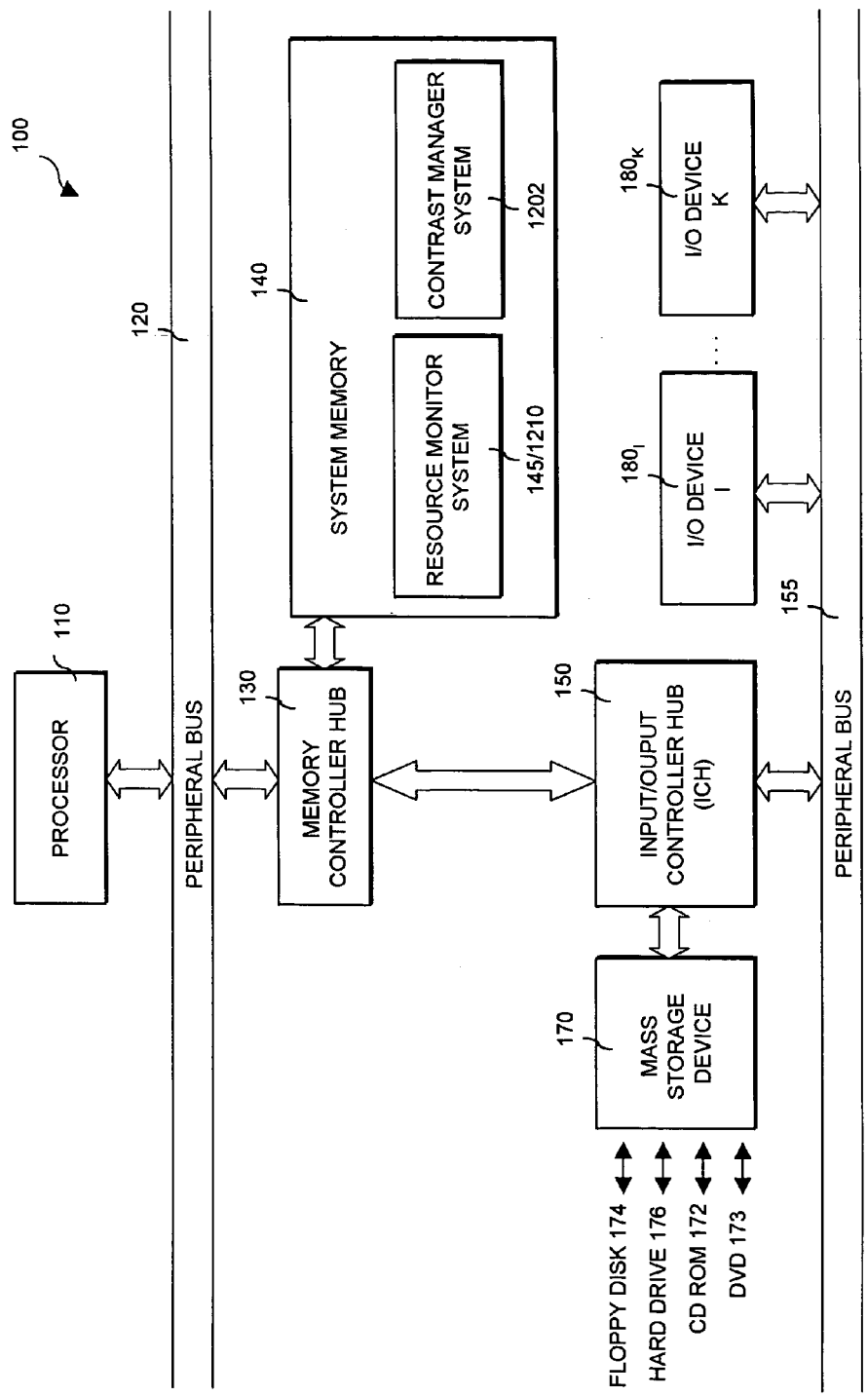
FIG. 1 is a diagram illustrating a computer system 100 in which one embodiment of the invention can be practiced.

FIG. 1 is a diagram illustrating a computer system 100 in which one embodiment of the invention can be practiced. The system 100 includes a processor 100, a processor bus 120, a memory control hub (MCH) 130, a system memory 140, an input/output control hub (ICH) 150, a peripheral bus 155, a mass storage device 170, and input/output devices $180_1$ to $180_K$. Note that the system 100 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory 140 may include program code or code segments implementing one embodiment of the invention. In the first embodiment, the system memory 140 includes a Resource Monitor system 145. In a second embodiment, the system memory 140 includes a Resource Monitor system 1210 and a Contrast Manager system 1202. Any one of the elements of the Resource Monitor system 145, or Resource Monitor system 1210 and a Contrast Manager system 1202, may be implemented by hardware, software, firmware, microcode, or any combination thereof. The system memory 140 may also include other programs or data which are not shown, such as an operating system. The Resource Monitor system 145, or Resource Monitor system 1210 and Contrast Manager system 1202, may implement all or part of the resource monitoring functions. The Resource Monitor system 145, or Resource Monitor system 1210 and a Contrast Manager system 1202, may also simulate the resource monitoring functions. The Resource Monitor system 145, or Resource Monitor system 1210 and a Contrast Manager system 1202, contains instructions that, when executed by the processor 110, causes the processor to perform the tasks or operations as described in the following.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, databases, applications, and operating systems. The mass storage device 170 may include compact disk (CD) ROM 172, a digital video/versatile disc (DVD) 173, floppy drive 174, and hard drive 176, and any other magnetic or optic storage devices such as tape drive, tape library, redundant arrays of inexpensive disks (RAIDs), etc. The mass storage device 170 provides a mechanism to read machine-accessible media. The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card such as institute of Electrical and Electronics Engineers (IEEE) 802.3, IEEE-1394, IEEE-802.11x, Bluetooth, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logic structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc. that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/ firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

Figure 2:
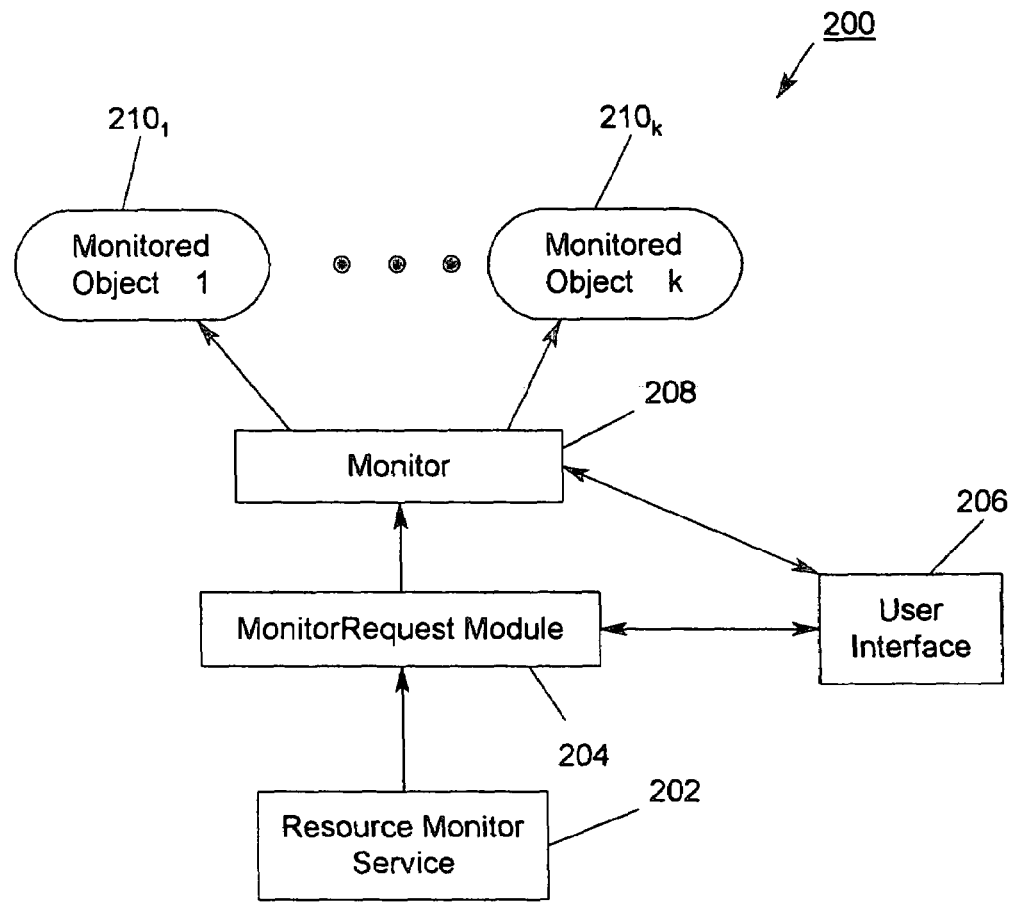
FIG. 2 is a block diagram illustrating a first embodiment of the Resource Monitor system of the present invention.

FIG. 2 is a block diagram illustrating a first embodiment of the Resource Monitor system of the present invention. Embodiment 200 comprises a MonitorRequest module 204, a user interface 206, a monitor 208, and an optional Resource Monitor Service 202. The MonitorRequest module 204 may be manually started by a user via the user interface 206, or automatically started by the Resource Monitor Service 202 upon reboot of the computer system that includes the Resource Monitor system 200.

In one embodiment, there is actually only one MonitorRequest module. If the MonitorRequest module is already active, any attempt to start it will result in a reference to the existing MonitorRequest module being returned to the initiator.

A user can designate a monitor as restartable monitor by setting a monitor property called AutoRestart. Necessary information of a restartable monitor is saved so that it can be restarted upon start-up of the Resource Monitor Service 202.

The MonitorRequest module 204 interfaces with a user via the user interface 206. Upon receipt of a user request from the user interface 206 to monitor specified resources, the MonitorRequest module 204 creates at least one monitor 208.

The monitor may be implemented as a COM object or a thread or a process.

If the specified resources are of the same type, the monitor 208 creates a collection of monitored objects $210_1 \ldots 201_k$, corresponding to the specified resources to monitor the specified resources. For example, if the specified resources are of the type "file object" that is, an object representing a file stored in a storage device, then the monitored objects correspond one-to-one to the specified files and each of the monitor objects represent a snapshot of the corresponding specified file at that point in time. If the specified resources are of the type "registry object", that is, an object representing a key value in a registry, then the monitored objects correspond one-to-one to the specified registry key values and each of the monitored objects represents a snapshot of the corresponding specified registry key value at that point in time. It is noted that a complete registry key may have several values, and each value is represented by a separate registry object.

If the specified resource is the set of all the processes that are active during the time the monitor 208 is active, then the monitor 208 keeps track of all such processes. The monitor 208 obtains data on any process that starts or ends, and logs the process starting time and ending time. In this case of process monitoring, no monitor object $210_i$ is created because no snapshot of a process is needed.

Figure 3:
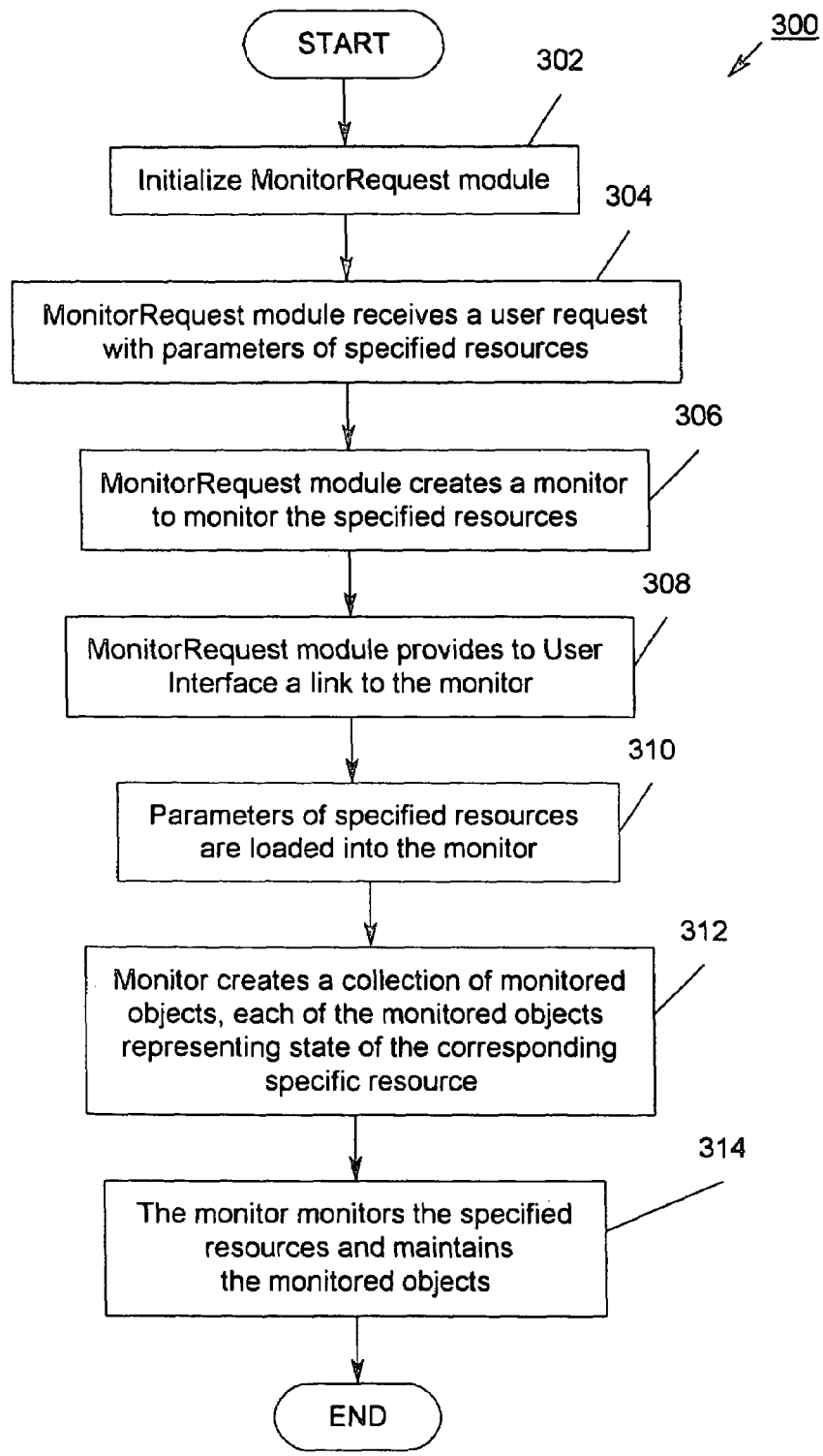
FIG. 3 is a flowchart illustrating one embodiment of the method of the present invention.

FIG. 3 is a flowchart illustrating one embodiment of the method of the present invention. Upon Start, process 300 initializes the MonitorRequest module 204 (block 302). The MonitorRequest module 204 receives a user request with parameters of specified resources, from user interface 206 (block 304). The monitorRequest module 204 creates a monitor 208 to monitor the specified resources (block 306). The MonitorRequest module 208 provides to the user interface a link, i.e., a reference, to the monitor 208 (block 308). Parameters of specified resources are loaded into the monitor 208 (block 310). It is noted that these parameters may be loaded either from the user interface 206 or from the MonitorRequest module 204. The monitor 208 creates a collection of monitored objects $210_i$, i=1, . . . , k, each of the monitored objects representing a snapshot of the corresponding specified resource taken at that point in time (block 312). The monitor 208 monitors the specified resources and maintains the collection of monitored objects (block 314).

Figure 4A:
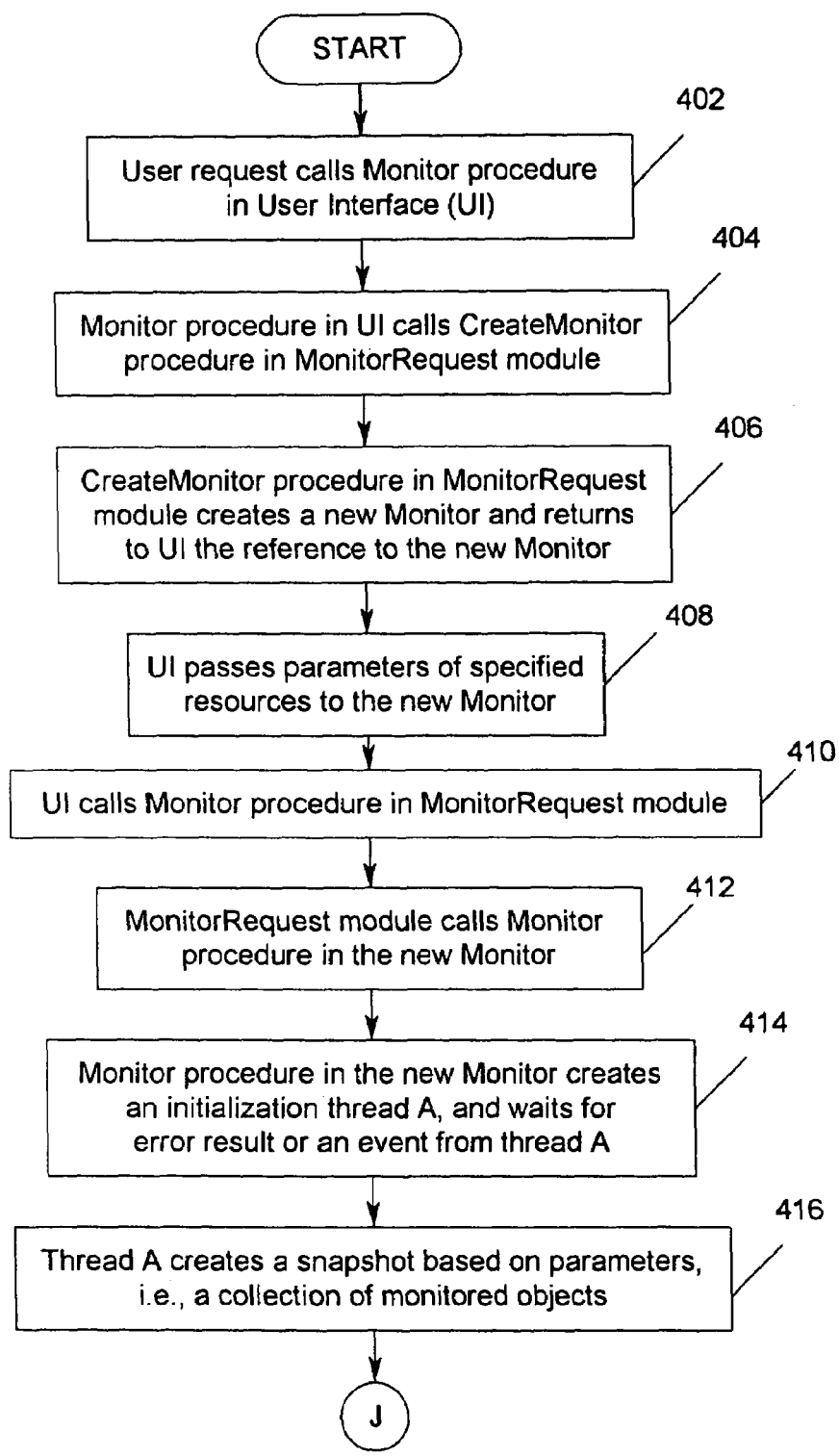
FIG. 4A and FIG. 4B are a flowchart illustrating an embodiment of the method to be practiced with the first embodiment of the Resource Monitor system.
Figure 4B:
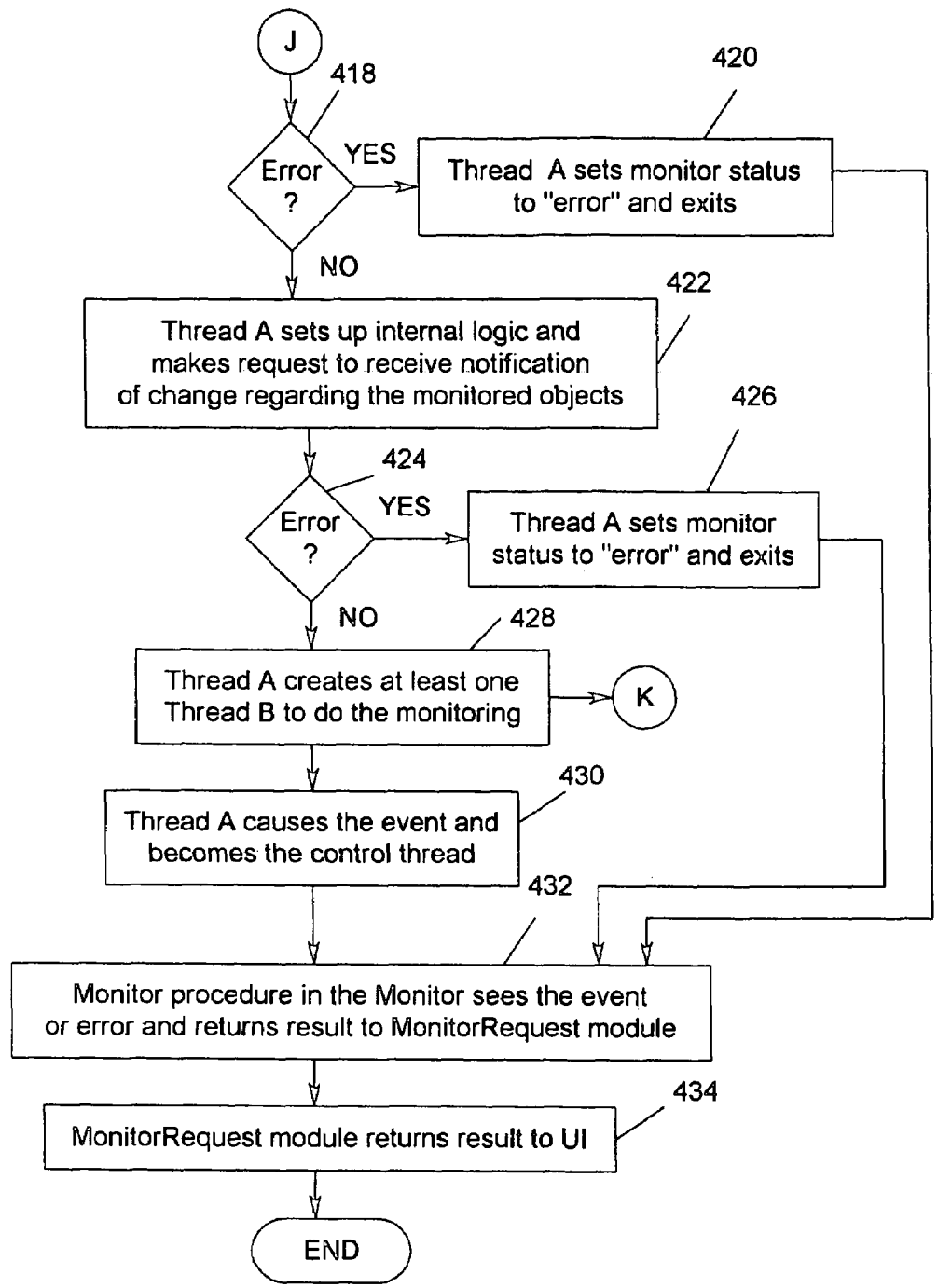

FIG. 4A and FIG. 4B are a flowchart illustrating an embodiment of the method to be practiced with the first embodiment of the Resource Monitor system.

Upon Start, the user request calls the Monitor procedure in the User interface 206 (block 402). The Monitor procedure in the User Interface 206 calls the CreateMonitor procedure in MonitorRequest module 204 (block 404). The CreateMonitor procedure in MonitorRequest module 204 creates a Monitor 208 (which is just an object having no attributes of the specified resources at this point), and returns to User Interface 206 the reference to the newly created Monitor 208 (block 406). The Monitor procedure in User Interface 206 transfers all parameters of specified resources to the new Monitor 208 (block 408). User Interface 206 calls the Monitor procedure in MonitorRequest module 204 (block 410), which then calls the Monitor procedure in the new Monitor (block 412). The Monitor procedure in the new Monitor 208 creates an initialization thread A, and waits for error result or event from initialization thread A (block 414). An event indicates successful initialization of the Monitor 208. An error result indicates an error encountered during the initialization of the Monitor 208.

Thread A creates a snapshot of specified resources based on the parameters already received from the User Interface. In other words, thread A creates a collection of monitored objects corresponding to the specified resources (block 416).

If there is an error in creating the snapshot (block 418), thread A sets the currently created monitor status to "error", and exits (block 420).

If there is no error in creating the snapshot, thread A sets up internal logic and makes request to receive notification of change regarding the monitored objects from the operating system (block 422). If there is any error at this point (block 424), thread A sets Monitor status to "error" and exits (block 426). For example, an error is encountered if a specified resource is already being monitored by an existing active monitor created prior to the new monitor. If there is no error, thread A creates at least one thread B to do the monitoring (block 428). Depending on the type of monitor and the numbered of monitored objects, more than one thread B may be needed. The monitoring function of thread B will be discussed in FIG. 4C and FIG. 4D.

After creating thread B (block 428), thread A causes the event indicating completion of the initialization of the Monitor, then thread A becomes the control thread for the Monitor 208 (block 430). By becoming the control thread for the Monitor, thread A allows control of the Monitor 208 by the user via a user request to the MonitorRequest module 204. User requests include "Stop" to stop the Monitor 208 from monitoring. "Start" to restart the Monitor 208, and "Quit" to terminate the Monitor 208.

The Monitor procedure in the Monitor 208 sees the event caused by thread A (in block 430) or the monitor status "error" set by thread A (in block 420 or block 426) and returns result to MonitorRequest module 204 (block 432). MonitorRequest module returns result to the User Interface 206 (block 434).

Thread B, created by thread A (FIG. 4B, block 428) does the monitoring, which includes waiting for notification of any changes to the monitored objects. The monitored objects associated with one Monitor may be files or registry key values, but not both. If there are both types of monitored objects in one user request, then two different Monitors 208$_1$, 208$_2$ are created to separately monitor each type of monitored objects. In other words, one Monitor 208$_1$ would monitor the file objects, while the other Monitor 208$_2$ would monitor the registry objects. It is noted that each Monitor 208$_i$ includes procedures, i.e., program code, to handle either type of monitored objects, but for efficiency reasons, can only maintain a collection of monitored objects of the same type.

Figure 4C:
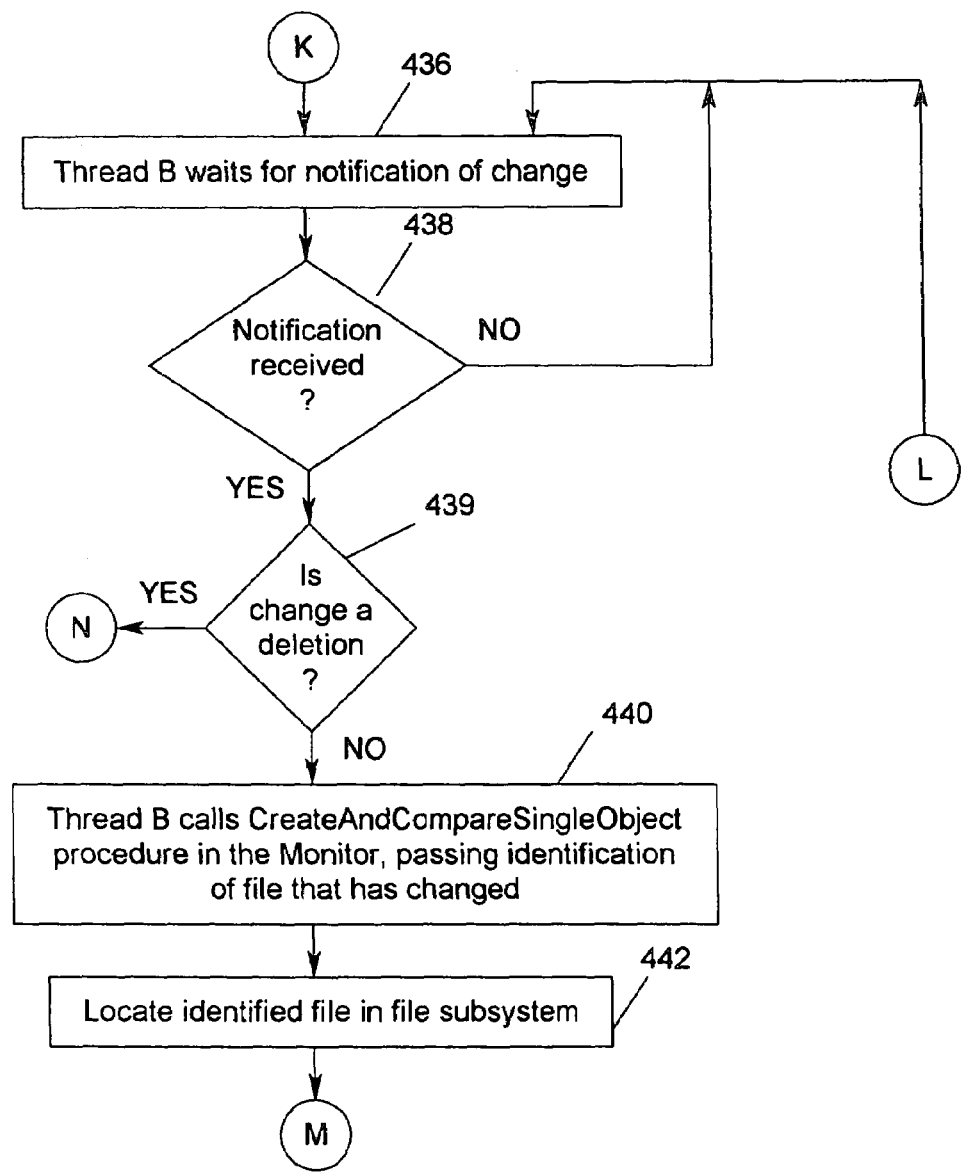
FIG. 4C and FIG. 4D are a flowchart illustrating one embodiment of the process of monitoring file objects.
Figure 4D:
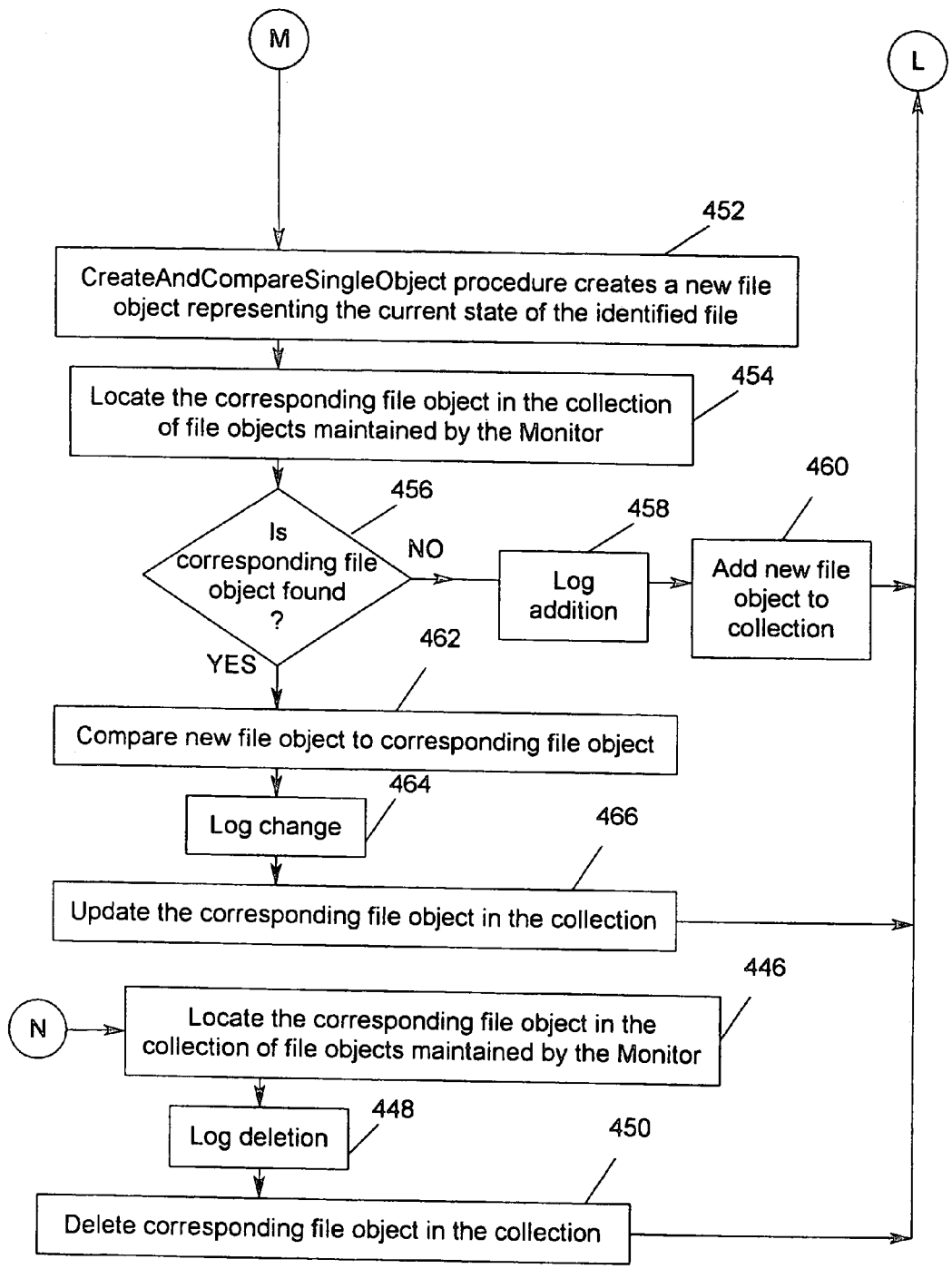

FIG. 4C and FIG. 4D are a flowchart illustrating one embodiment of the process of monitoring file objects.

After being created by thread A (FIG. 4B, block 428, or FIG. 13B, block 1328), thread B waits for notification of change from the operating system regarding the specified resources (block 436). If there is no notification of change (block 438), thread B stays in the waiting loop (block 436).

If a notification of change is received, and if the change is a deletion, thread B locates the corresponding file object (representing a previous state of the identified file) in the collection of file objects maintained by the Monitor 208 (block 446). Thread B logs the deletion (block 448), and deletes the corresponding file object in the collection (block 450). Thread B then waits for a new notification of change (block 436).

If a notification of change is received, and if it is not a deletion (block 439) then thread B calls the procedure CreateAndCompareSingleObject in the Monitor 208 and passes to the procedure the identification of the file that has changed (block 440). The procedure requests to locate the identified file in the file subsystem (block 442).

The CreateAndCompareSingleObject procedure creates a new file object representing the current state of the identified file (block 452). The procedure then locates the corresponding file object, representing a previous state of the identified file, in the collection of file objects maintained by the Monitor 208 (block 454).

If the corresponding file object is not found in the collection of file objects (block 456), indicating that the identified file is recently added to the file subsystem, then thread B logs the addition (block 458), and adds the new file object to the collection of file objects maintained by the Monitor 208 (block 460). Thread B then waits for a new notification of change (block 436).

If the corresponding file object is found in the collection of file objects, then the newly created file object is compared to this corresponding file object in the collection to determine what has been changed (block 462). The change, that is, information pertaining to previous state and current state of identified file, is logged for the records (block 464) and the corresponding file object in the collection is updated (block 466). The file object may be updated either directly or by being swapped with the newly created file object. Thread B then waits for a new notification of change (block 436).

The monitoring process of registry objects in similar to the monitoring process of file objects shown in FIG. 4C and FIG. 4D, with a few differences due to the fact that a complete registry key may have several values.

When thread B gets notification of a change to a registry key, thread B calls the procedure CreateAndCompareMultipleObjects in Monitor, passes to this procedure the identification of the registry key that has the change. If the identified registry key has multiple values, the CreateAndCompareMultipleObjects procedures creates multiple objects, each representing the current state of a corresponding value of the identified registry key.

If the collection of registry objects maintained by Monitor includes a registry object representing a previous state of a value of the identified key, when the newly created registry object associated with this registry key value is compared to the corresponding registry object in the collection to determine what has been changed. The corresponding registry object in the collection of registry objects maintained by Monitor 208 is updated, and the change is logged for the records. If the change is deletion of that value of the identified registry key, then the deletion is logged for the records. Once the information data associated with this registry object with "deleted" status is logged, this registry object may be removed from the collection of registry objects maintained by Monitor.

If the collection of registry objects maintained by Monitor does not include any registry object corresponding to a value of the identified key, then the addition is logged for the records, and the newly created registry object is added to the collection of registry objects maintained by Monitor.

In another embodiment of the system of the present invention, the Resource Manager 1210 (FIG. 1) instantiates a Contrast Manager 1202 to obtain snapshots of specified resources.

Figure 5:
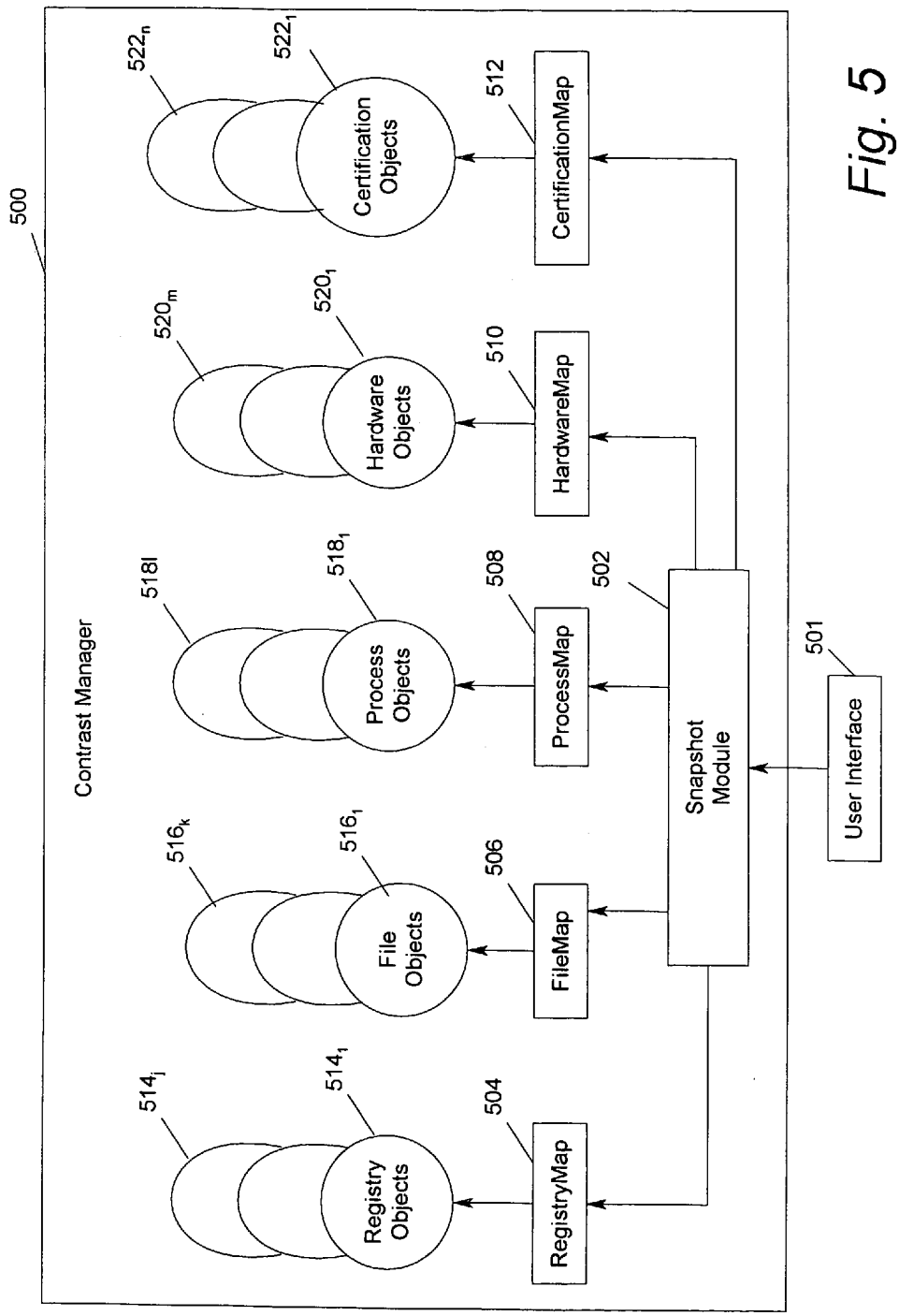
FIG. 5 is a block diagram illustrating an embodiment of the Contrast Manager system 500.

FIG. 5 is a block diagram illustrating an embodiment of the Contrast Manager system 500. The Contrast Manager 500 comprises a Snapshot module 502 and a plurality of Map objects including at least a RegistryMap 504 and a FileMap 506. Contrast Manager 500 may also include other map objects such as a ProcessMap 508, a HardwareMap 510 and a CertificationMap 512. A user can interface with the Snapshot module 502 using a User Interface 501 which may be a scripting Application Programming Interface (API) or a snap-in to a management console (such as the Microsoft Management Console of Windows, owned by Microsoft Corporation). Upon being instantiated, the Snapshot module 502 instantiates the collection of Map objects 504, 506, 508, 510, 512. Each of the Map objects maintains a collection of objects of the same type. The RegistryMap maintains a collection of registry objects $514_1, \ldots, 514_j$. The FileMap maintains a collection of registry objects $516_1, \ldots, 516_k$. The ProcessMap maintains a collection of registry objects $518_1, \ldots, 518_l$. The HardwareMap maintains a collection of hardware objects $520_1, \ldots, 520_m$. The CertificationMap maintains a collection of certification objects $522_1, \ldots, 522_n$.

Figure 6:
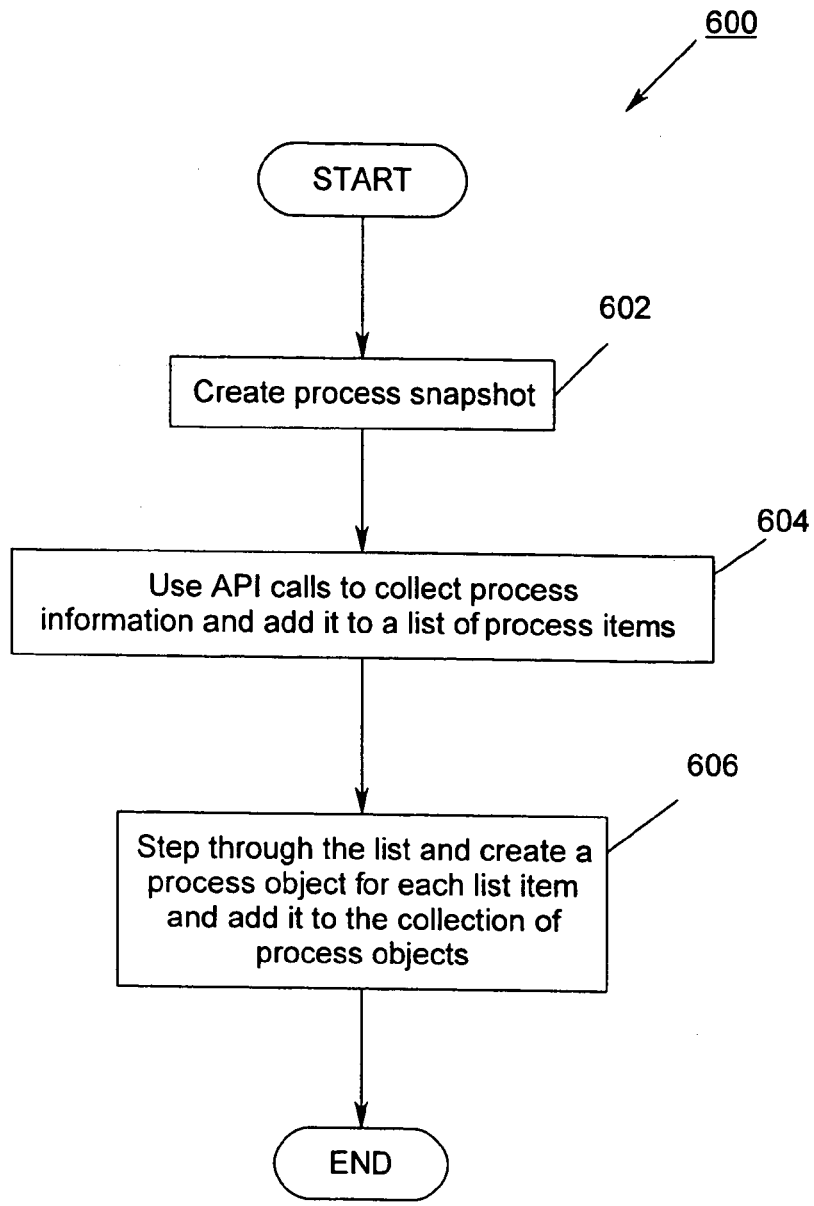
FIG. 6 is a flow chart illustrating an embodiment of the process of creating a process snapshot.

FIG. 6 is a flow chart illustrating an embodiment of the process of creating a process snapshot. Upon Start, process 600 receives a user request to create a process snapshot (block 602). Process 600 uses Application Programming Interface (API) calls to collect process information for each process and adds the information to a list of process items (block 604). Process 600 steps through the list of process items, creates a process object for each list item, gets attributes of that process item and stores the attributes into the newly created process object. Process 600 adds the newly created process objects to a collection of process objects (block 606) and terminates.

Figure 7:
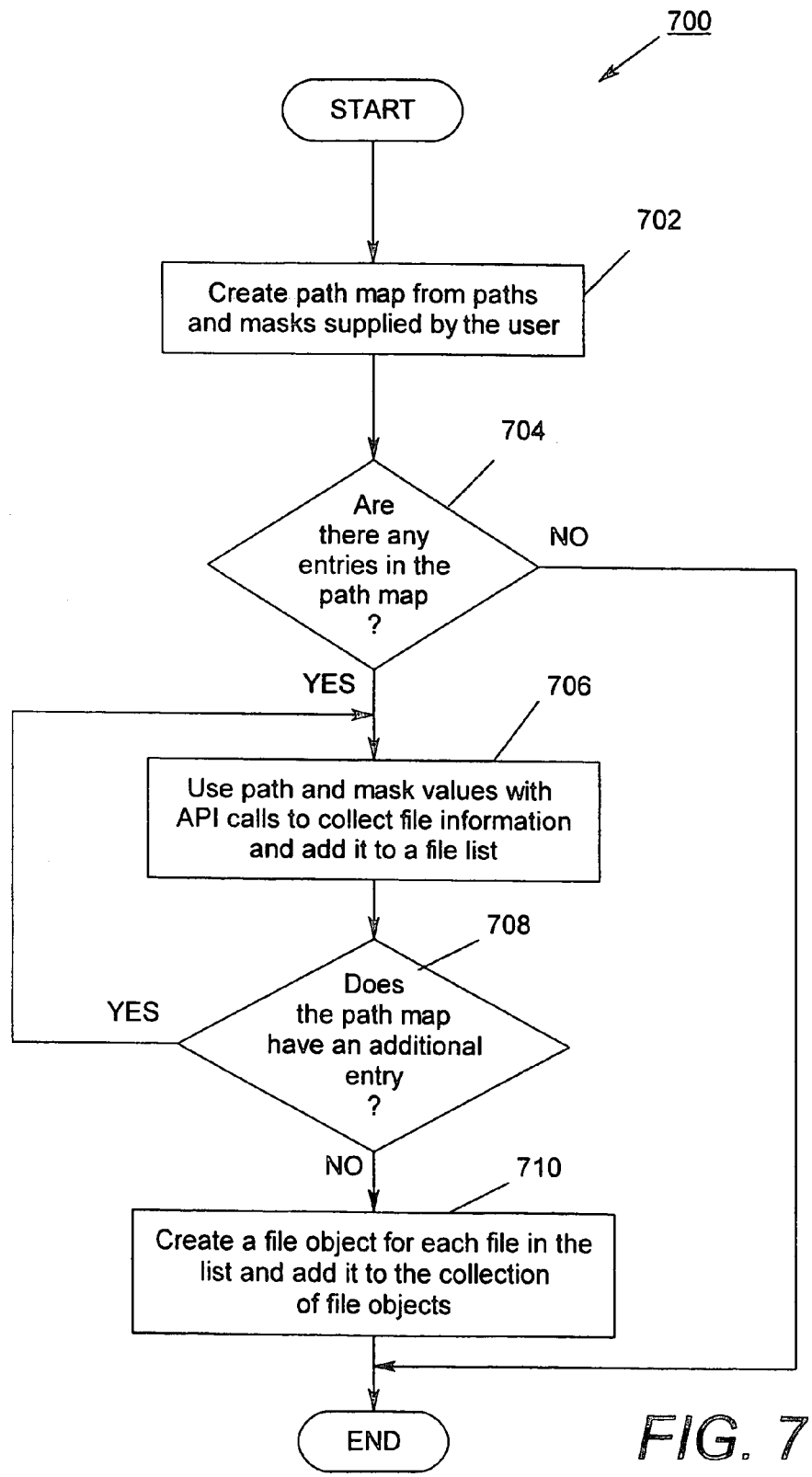
FIG. 7 is a flow chart illustrating an embodiment of the process of creating a file snapshot.

FIG. 7 is a flow chart illustrating the process of creating a file snapshot. Upon Start, process 700 creates the path map from the paths and masks supplied by the user (block 702). Process 700 checks whether there is any entry in the path map (block 704). If there is no entry in the path map, then the process 700 terminates.

If there is an entry in the path map, then process 700 uses the path and mask values in API calls to collect file information and adds the file information to to a file list (block 706). Process 700 checks whether the path map has an additional entry (block 708). If the path map has additional entry, process 700 goes to the block 706 to collect file information for the additional entry. If there are no more entries, then process 700 creates a file object for each file in the list, gets attributes of that file and stores the attributes in the newly created file object. Process 700 adds the newly created file objects to a collection of file objects (block 710) and terminates.

Figure 8:
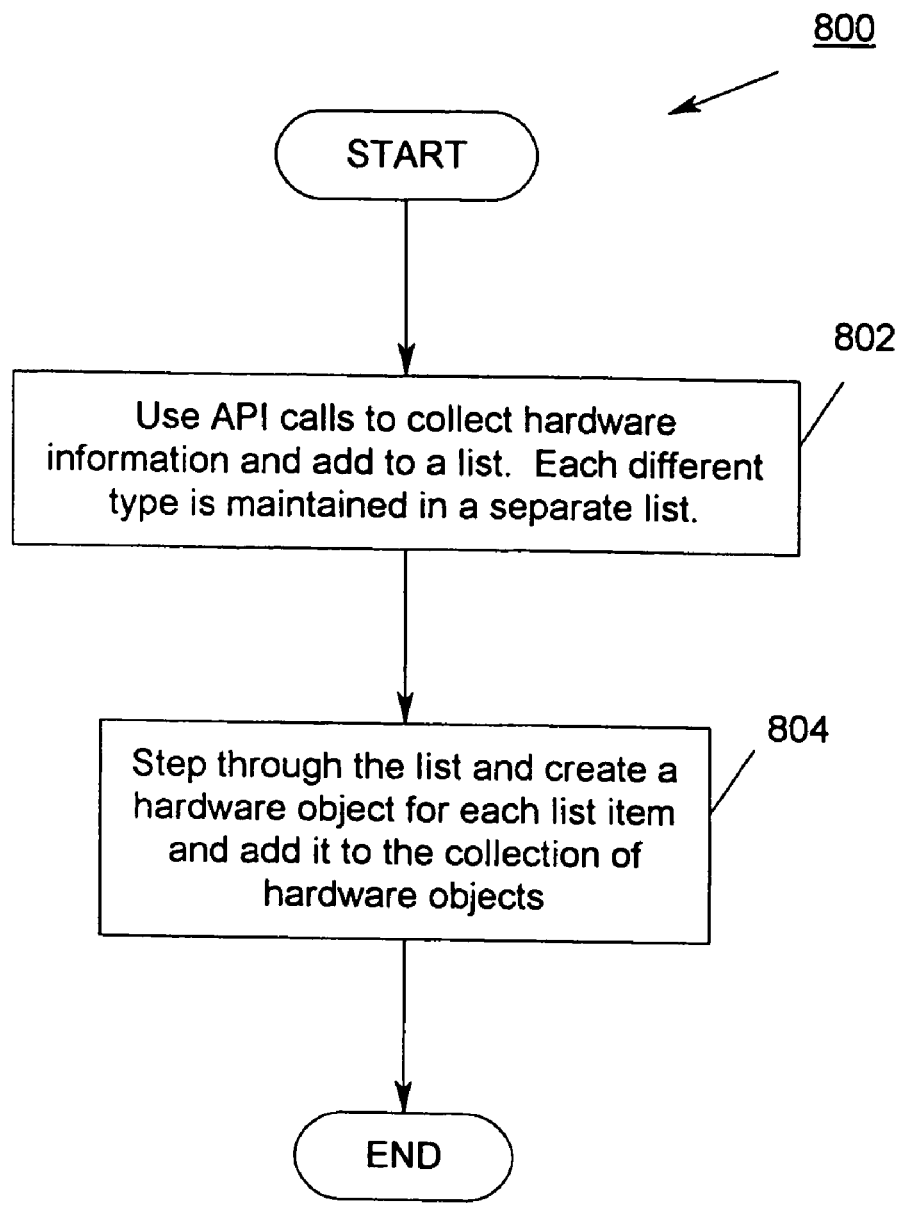
FIG. 8 is a flow chart illustrating an embodiment of the process of creating a hardware snapshot.

FIG. 8 is a flow chart illustrating the process of creating a hardware snapshot. Upon Start, process 800 uses API calls to collect hardware information and added the information to a list. Each different type of hardware is maintained in a separate list (block 802). Process 800 steps through the list and creates a hardware object for each item in the list, gets attributes of that list item and stores the attributes in the newly created hardware object. Process 800 adds the newly created hardware objects to a collection of hardware objects (block 804) and terminates.

Figure 9A:
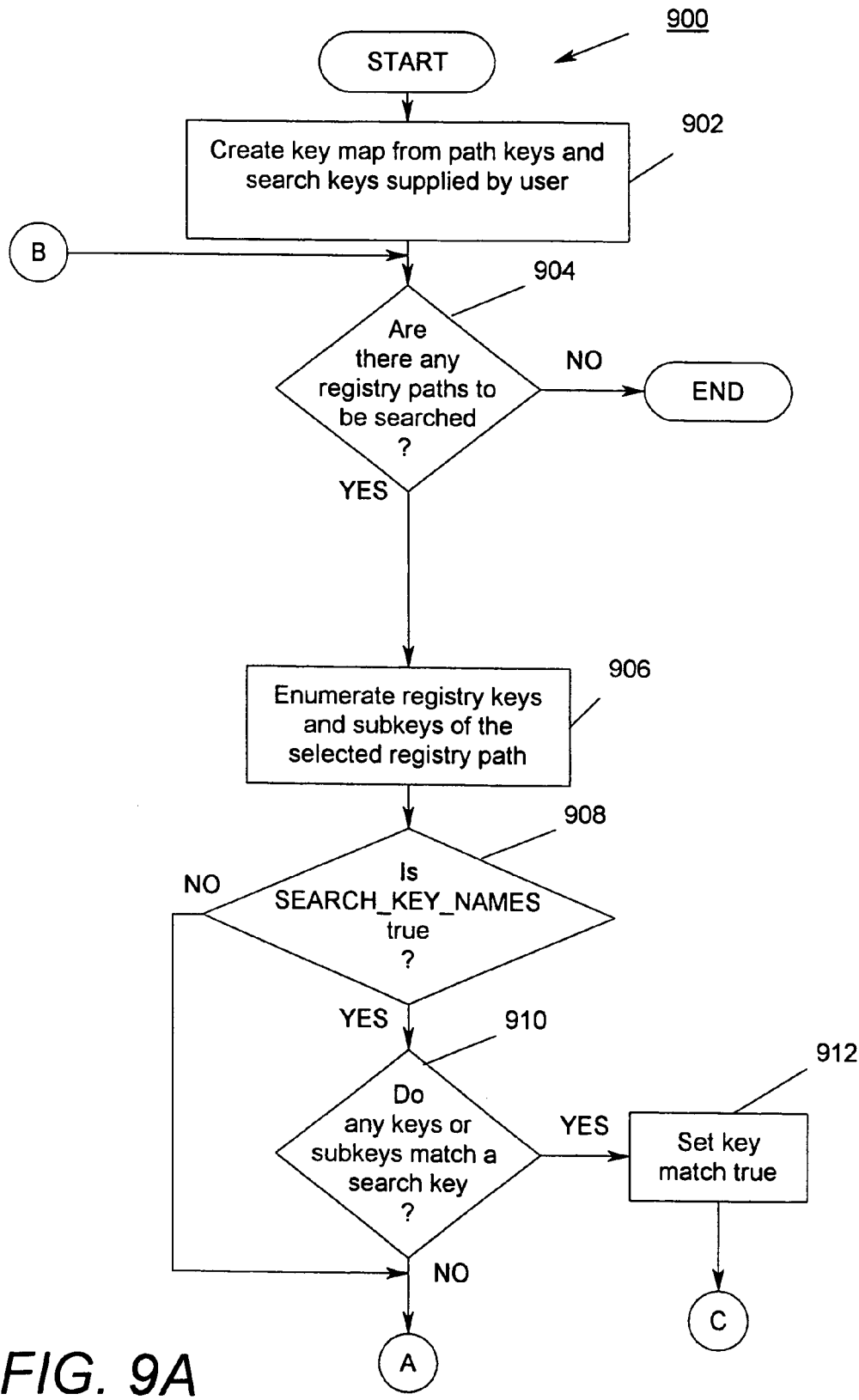
FIG. 9A and FIG. 9B is a flow chart of an embodiment of the process of creating a registry snapshot.
Figure 9B:
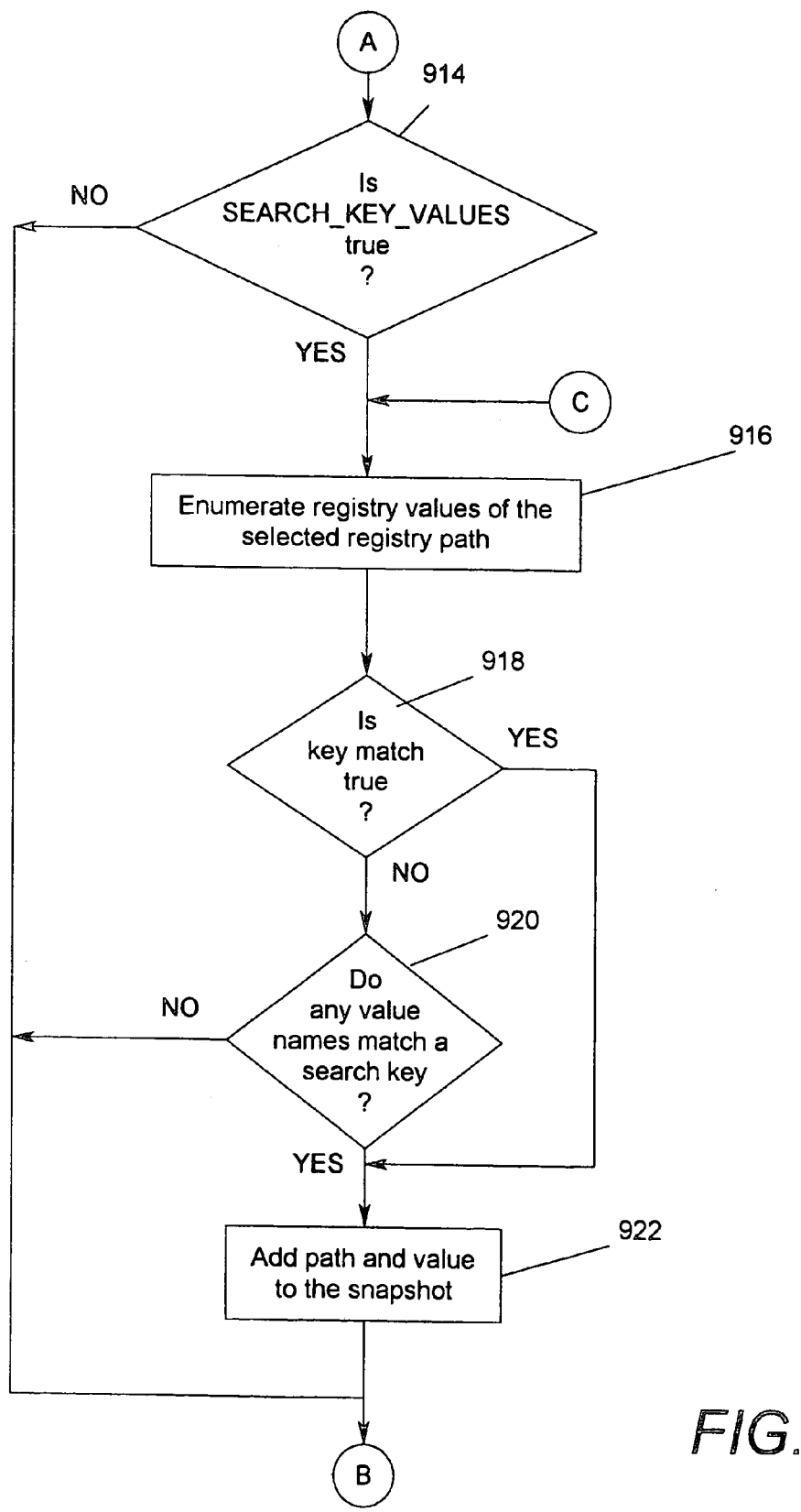

FIG. 9A and FIG. 9B is a flow chart of an embodiment of the process of creating a registry snapshot. Upon Start, process 900 creates a keymap from the path keys and searchkeys supplied by the user (block 902). Process 900 checks whether there are any registry paths in the keymap to be searched (block 904). If there is none, then process 900 terminates.

If there is a registry path in the keymap to be searched, then process 900 enumerates the registry keys and subkeys of the selected registry path, that is, using API calls to traverse the selected registry path (block 904). Process 900 then checks whether the search_key_names is set to true (block 908).

If the search_key_names is not set to true, the process 900 checks whether the search_key_values is set to true (block 914).

If the search_key_names is set to true, the process 900 checks whether there is any key or subkey that matches a search key (block 910).

If there is any key or subkey that matches a search key, process 900 sets the key match to true (block 912), then enumerates the registry values of the selected registry path (block 916), skipping block 914 (no need to check for value of the search_key_values).

If there is no such key or subkey, then process 900 checks whether the search_key_values is set to true (block 914).

If the search_key_values is not set to true, then process 900 goes back to block 904 to check whether there is any other registry path to be searched.

If the search_key_values is set to true, then process 900 enumerates the registry values of the selected registry path (block 916), using API calls. Process 900 then checks whether the key match is set to true (block 918).

If the key match is set to true (this means that process 900 arrives here from the Yes branch of block 910), process 900 adds the path and value to the snapshot (block 922), then goes back to block 904 to check whether there is any other registry path to be searched.

If the key match is not set to true (this means that process 900 did not get here from the Yes branch of block 910), process 900 checks whether there is any value names that match a search key (block 920).

If there is no such value name, then process 900 goes back to block 904 to check whether there is any other registry path to be searched.

If there is value name that match a search key, process 900 adds the path and value to the snapshot (block 922), then goes back to block 904 to check whether there is any other registry path to be searched.

Figure 10A:
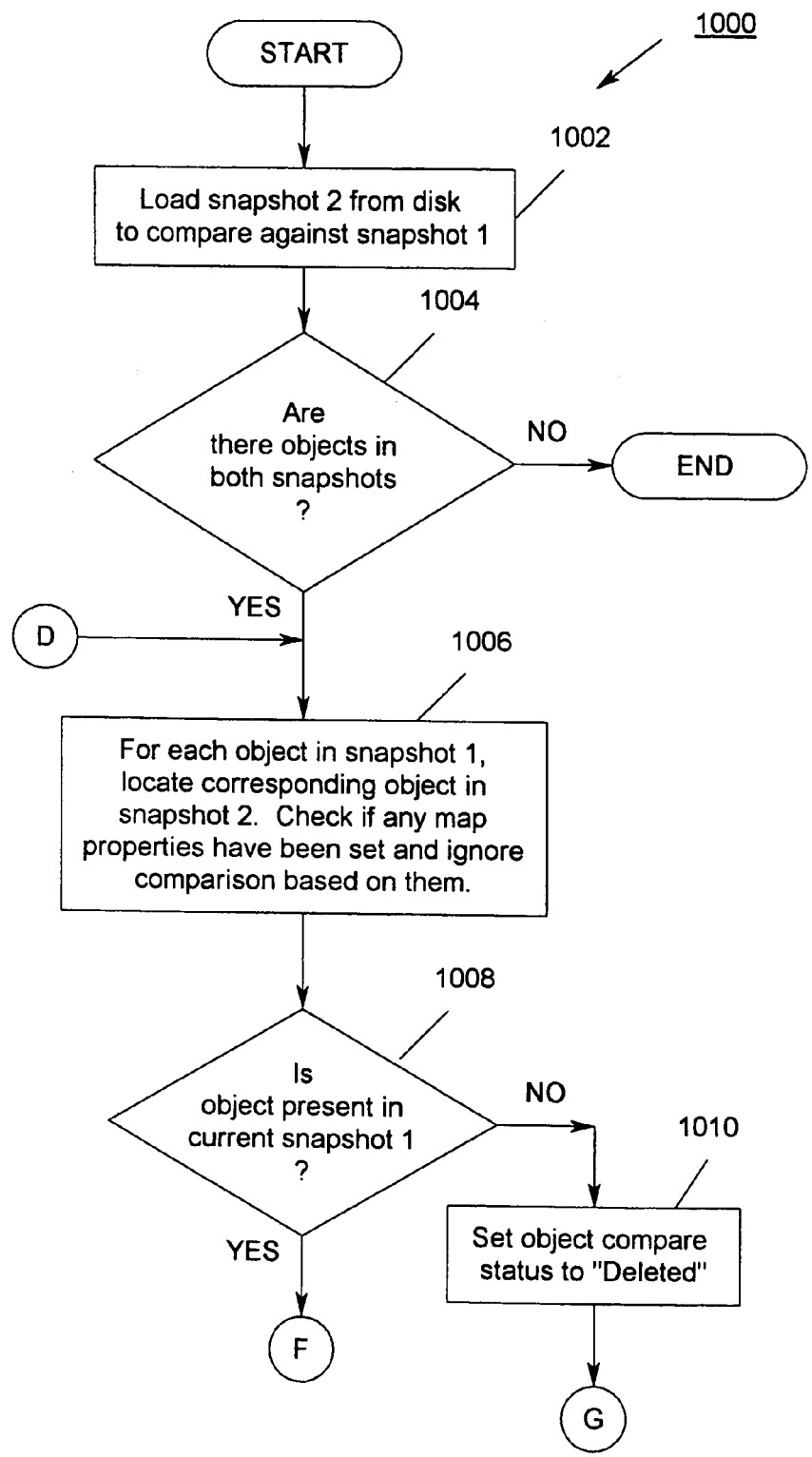
FIG. 10A and FIG. 10B are a flowchart that illustrates an embodiment of the process of comparing a previously stored snapshot with a current snapshot.
Figure 10B:
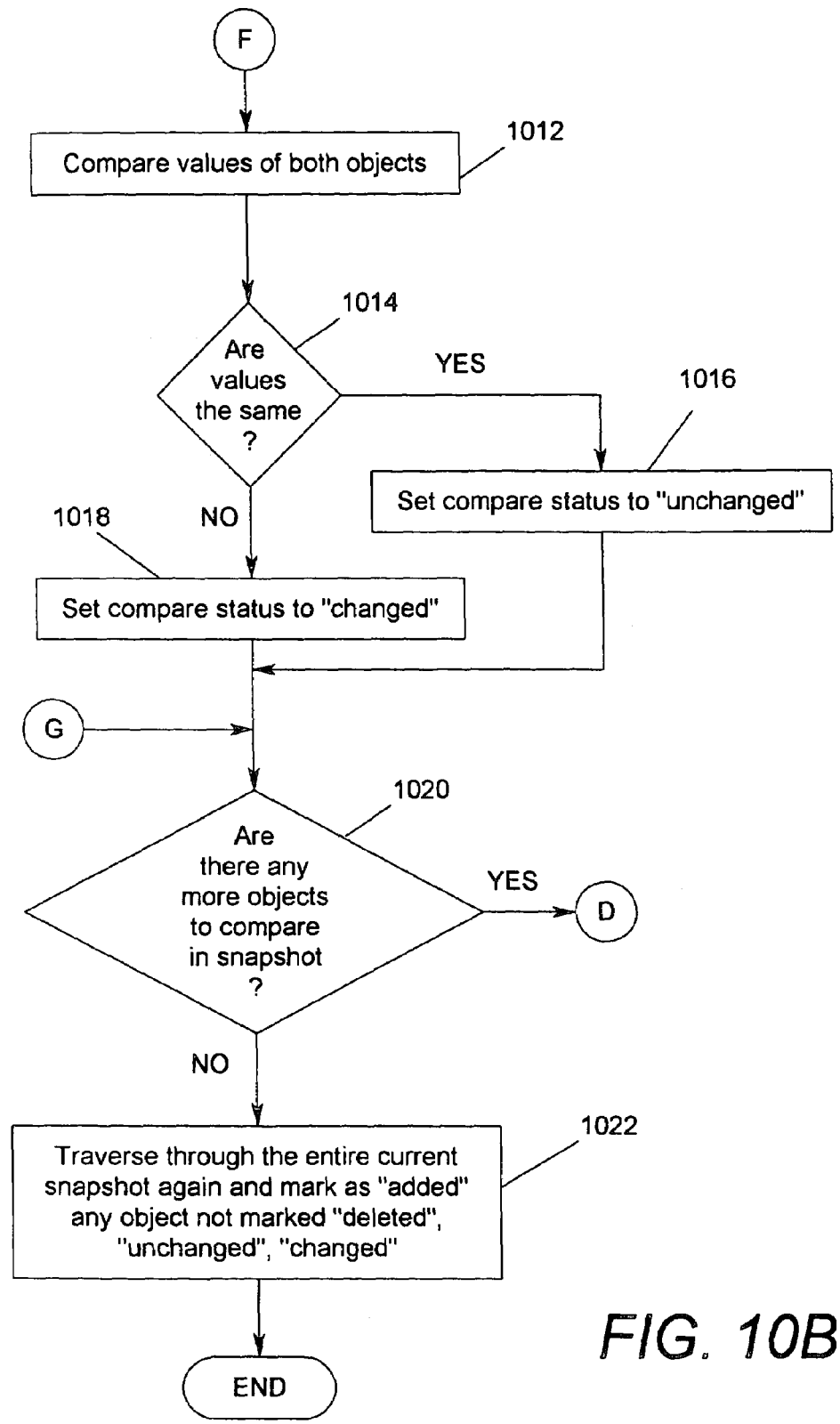

FIG. 10A and FIG. 10B are a flowchart that illustrates an embodiment of the process of comparing a previously stored snapshot with a current snapshot.

Upon Start, process 1000 loads the snapshot 2 from a storage device to compare it with the current snapshot 1 in memory (block 1002). Process 1000 checks whether there are objects in both snapshots (block 1004). If there are no objects in both snapshots, i.e., both snapshots are empty, then process 1000 terminates.

If there are objects in both snapshots, then, for each object in snapshot 2, process 1000 locates the corresponding object in current snapshot 1. A check is made as to whether any map properties have been set that would affect the comparison of the file and process objects (block 1006). Some of these map properties (such as CompareDrives, ComparePath properties of FileMap, and ComparePID and ComparePath properties of ProcessMap) are discussed later in relation in FIG. 11.

Process 1000 checks whether an object in snapshot 2 has a corresponding object in current snapshot 1 (block 1008). If there is no such corresponding object in snapshot 1, this means the object has been deleted.

If there is a corresponding object in current snapshot 1, then process 1000 compares the attributes of the two objects (block 1012). Process 1000 checks whether the attributes have the same values (block 1014).

If the attributes are the same, process 1000 sets Compare Status to "Unchanged" (block 1016) and go to block 1020. If the attributes do not have the same values, process 1000 sets Compare Status to "Changed" (block 1018).

Process 1000 then checks whether there are more objects to compare in the snapshot 2 (block 1020). If there is no more object in snapshot 2 to compare to, process 1000 traverses through the entire current snapshot 1 and mark as "Added" any object that is not marked "Deleted", "Unchanged", "Changed" (block 1022). Process 1000 then terminates.

If an object in snapshot 2 does not have a corresponding object in current snapshot 1, then process 1000 marks the object Compare Status as "Deleted" and adds the "Deleted" object to the current snapshot 1 (block 1010). Adding the object means adding a reference to it. Process 1000 then terminates.

Figure 11:
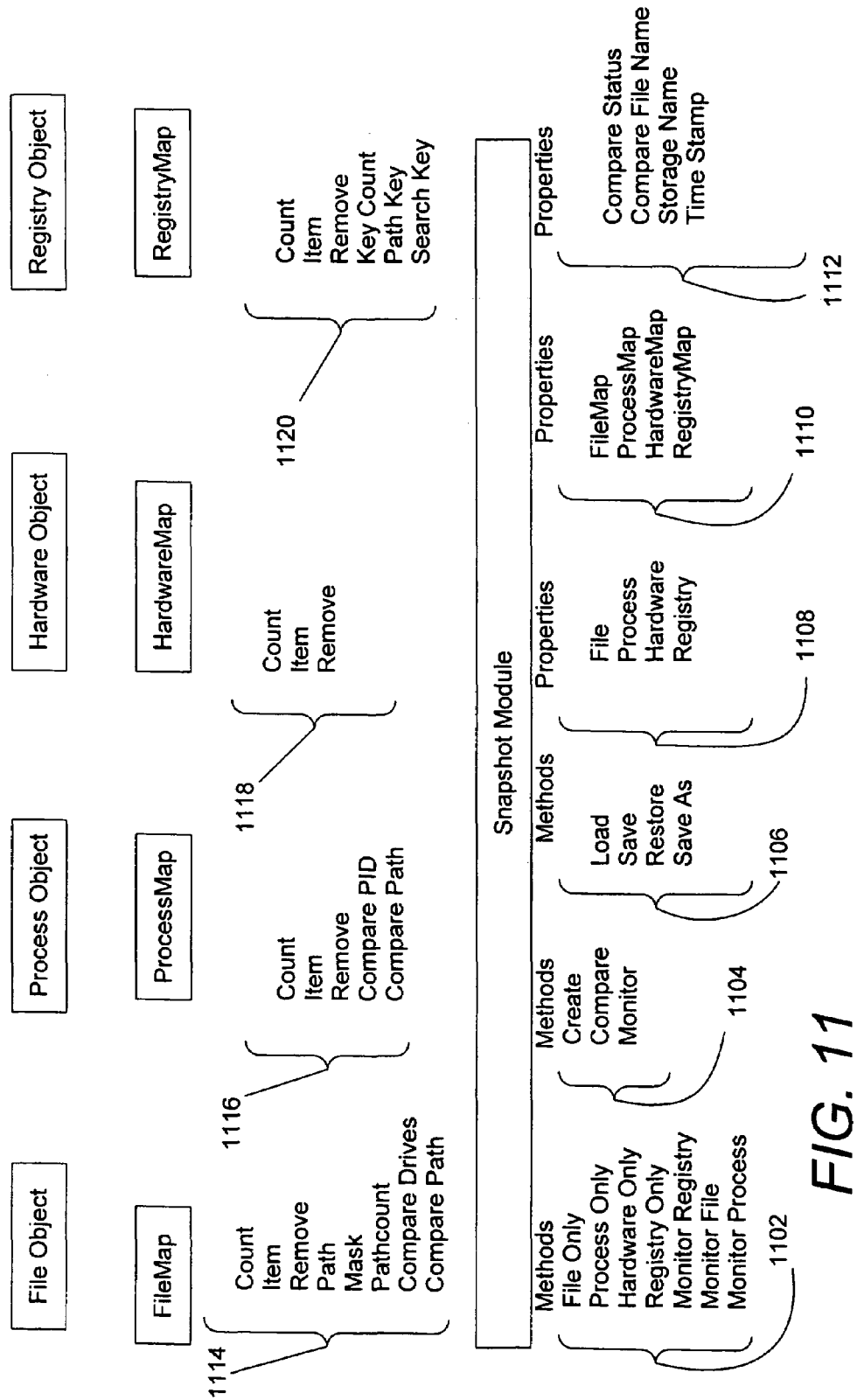
FIG. 11 shows exemplary lists of methods (i.e., procedures) and properties of the Snapshot module and of the various Map objects.

FIG. 11 shows exemplary lists of methods (i.e., procedures) and properties of the Snapshot module and of the various Map objects. These methods and properties are visible to the user. These lists are only exemplary, and are not complete.

The Snapshot module provides a common user interface with a set of properties and methods, through which the functionality of the present invention can be accessed.

The Create method (within group 1104) can be used to create a snapshot of specified resources. A user can specify which type of resources can be included in a snapshot by selecting the properties File, Process, Hardware, or Registry (within group 1108) of the Snapshot module and setting the selected properties to TRUE. The Create method of the snapshot module in turn calls a Create method in each one of the Map objects, that is, File Map, ProcessMap, HardwareMap, and RegistryMap. These map objects then hold a collection of the file, process, hardware, or registry objects, respectively. These map objects, i.e., the File Map, the Process Map, the Hardware Map and the Registry Map have their own special properties and methods, which can be accessed via the Snapshot module.

The properties and methods of the map objects provide the functionality needed to create and compare the individual types of System State objects that they hold. For example, Path and Mask properties (within properties group 1114) of the FileMap, are a means for specifying the path and mask combination of the location of the file system that needs to be recorded by the snapshot. Similarly, Path_Key (within properties group 1120) is a property of the Registry Map and specifies a particular part of the registry. A Path_Count property (within the properties group 1114) provides a means for counting the number of path entries specified. Similarly, a Key_Count property (within the properties group 1120) of the Registry Map, provides a means to count the number of Path_Keys specified.

Some properties or methods of the map objects are common to all map objects. These are Count, Item and Remove properties or methods which are standard properties and methods of all collections. The Count property returns the number of objects in the collection of objects held by any map object. The Item method allows access to a single object in the collection of objects held by a map object by specifying the name or index of the desired object. The Remove method removes a user specified object from the collection of objects held by the map objects. These common properties of the map object as well as the individual system objects can be accessed through the common interface of the Snapshot module by using the methods and properties from group 1110.

A Compare method in group 1104 of the Snapshot module can be used to compare snapshots of system states taken at different times. A Compare method is preceded by a Load method (within group 1106), which is used to load a previously taken snapshot from the disk and load it into memory. Subsequently, Compare calls the Compare methods in each of the individual map objects to compare the collection of the currently held System State objects in the map objects with the System State objects of the snapshot loaded into the memory. The result of this compare operation is that any changes, additions or deletions of objects and their values between the two snapshots is marked out in the snapshot currently held by the map objects. Thus, after the Compare operation, the collection of System State objects held by the map objects reflect the changes, if any, between the two snapshots. These changes can be restored, so that the current snapshot is returned to its original state by using a Restore method (within group 1106). Also, a SaveAs method 72 can be used to save any snapshot into the disk.

There are properties in the individual map objects that can be used to define what attributes of the System State objects should be considered or ignored while performing the compare method. For example, the property Compare Drives (within the properties 1114) and the property Compare Path (within the properties 1114) in the FileMap can be set to false, which would indicate to the Compare method that any differences in drive names, or path names between the two snapshots should be ignored. It would indicate to the compare method that only the values defined by the particular drive and path combination should be compared. Similarly, Compare PID and Compare Path properties (within the properties 1116) of the ProcessMap can be used to ignore comparisons on the basis of PID's and paths when comparing processes running on the system. Also, a Search Key property (within the properties 1120) of the RegistryMap can be used to specify a particular value that needs to be searched in a part of the registry specified by the Path Key.

The set of properties within group 1112 provide query information about the snapshots. Compare Status holds information as to whether a snapshot has been compared with another snapshot. Compare File Name provides the name of the snapshot against which the current snapshot was compared Storage Name provides the name of the file or the storage pointer of the current snapshot. Timestamp provides the time when the current snapshot was created.

FIG. 12 is a block diagram illustrating a system 1200 comprising a second embodiment 1210 of the Resource Monitor system and a Contrast Manager system 1202.

Embodiment 1210 of the Resource Monitor system comprises a MonitorRequest module 1212, a monitor 1214, and an optional Resource Monitor Service 1211. The MonitorRequest module 1212 may be started by the Snapshot module 1204, or automatically started by the Resource Monitor Service 1211 upon reboot of the computer system that includes the Resource Monitor system 1210.

The Contrast Manager 1202 comprises a Snapshot module 1204 and a plurality of Map objects including at least a RegistryMap 1206 and a FileMap 1208. Contrast Manager 1202 may also include other map objects such as a ProcessMap, a HardwareMap and a CertificationMap. A user can interface with the Snapshot module 1204 using a User Interface 1201 which may be a scripting Application Program Interface (API) or a snap-in to a management console. Upon being instantiated, the Snapshot module 1204 instantiates the collection of Map objects 1206, 1208.

Embodiment 1210 of the Resource Monitor system comprises a MonitorRequest module 1212, a monitor 1214, and an optional Resource Monitor Service 1211. The MonitorRequest module 1212 may be started by the Snapshot module 1204, or automatically started by the Resource Monitor Service 1211 upon reboot of the computer system that includes the Resource Monitor system 1210.

A user defines the parameters for the specified resources to be monitored the same way as in the case of defining parameters for a standard static snapshot of the specified resources. But instead of calling the Create procedure in the Snapshot module 1204, the Monitor procedure is called. Upon receipt of a user request from the user interface 1201 to monitor specified resources, the Monitor procedure in the Snapshot module 1204 calls the Monitor procedure in FileMap 1208. The Monitor procedure in FileMap 1208 then calls the CreateMonitor procedure in MonitorRequest module 1212. The CreateMonitor procedure in MonitorRequest module creates a Monitor 1214 (which is just an empty object at this point), and returns to FileMap 1208 the reference to the newly created Monitor 1214. The Monitor procedure in FileMap 1208 transfers all parameters of specified resources, i.e., the snapshot parameters defined by the user, to the new Monitor 1214. FileMap 1208 calls the Monitor procedure in MonitorRequest module 1212, which then calls the Monitor procedure in the new Monitor 1214.

Monitor 1214 instantiates the Snapshot module 1218 to create monitored objects corresponding to states of the specified resources at that point in time. Upon being instantiated, the Snapshot module 1218 instantiates RegistryMap 1220 and FileMap 1222, and creates the monitored objects shown as file objects $1224_1$ through $1224_k$. The Snapshot module 1218, the map objects 1220, 1222, and the monitored objects $1224_1, \ldots, 1224_k$ constitute the Contrast Manager 1216. The Monitor 1214 maintains links to the snapshot module 1218 and the Map objects 1220, 1222 of the instantiated Contrast Manager 1216. The Monitor 1214 maintains a link to a unique instantiation 1216 of the Contrast Manager.

It is noted that, in general, there are more than one Monitors at any given time, each maintaining a link to its unique instantiation of the Contrast Manager.

The Contrast Manager is implemented as a dll which runs in the process space of the initiator. Contrast Manager 1202 runs in process space 1 of the User Interface 1201 which is a snap-in, or script, or another exe. The Resource Monitor 1210 is a service, that is an exe, that runs in its own process space 2. Contrast Manager 1216 runs in the same process space 2 of the Resource Monitor 1210. One advantage of having an instantiation 1216 of the Contrast Manager running in same process space as the Resource Monitor 1210 is that low overhead is achieved since, once initiated, monitoring processes are running in a common process space. Overhead caused by communication between two different process spaces can be expensive in terms of time and usage of resources. Another advantage is that, with this scheme, only Snapshot module 1204 is used to create many monitors.

Figure 13A:
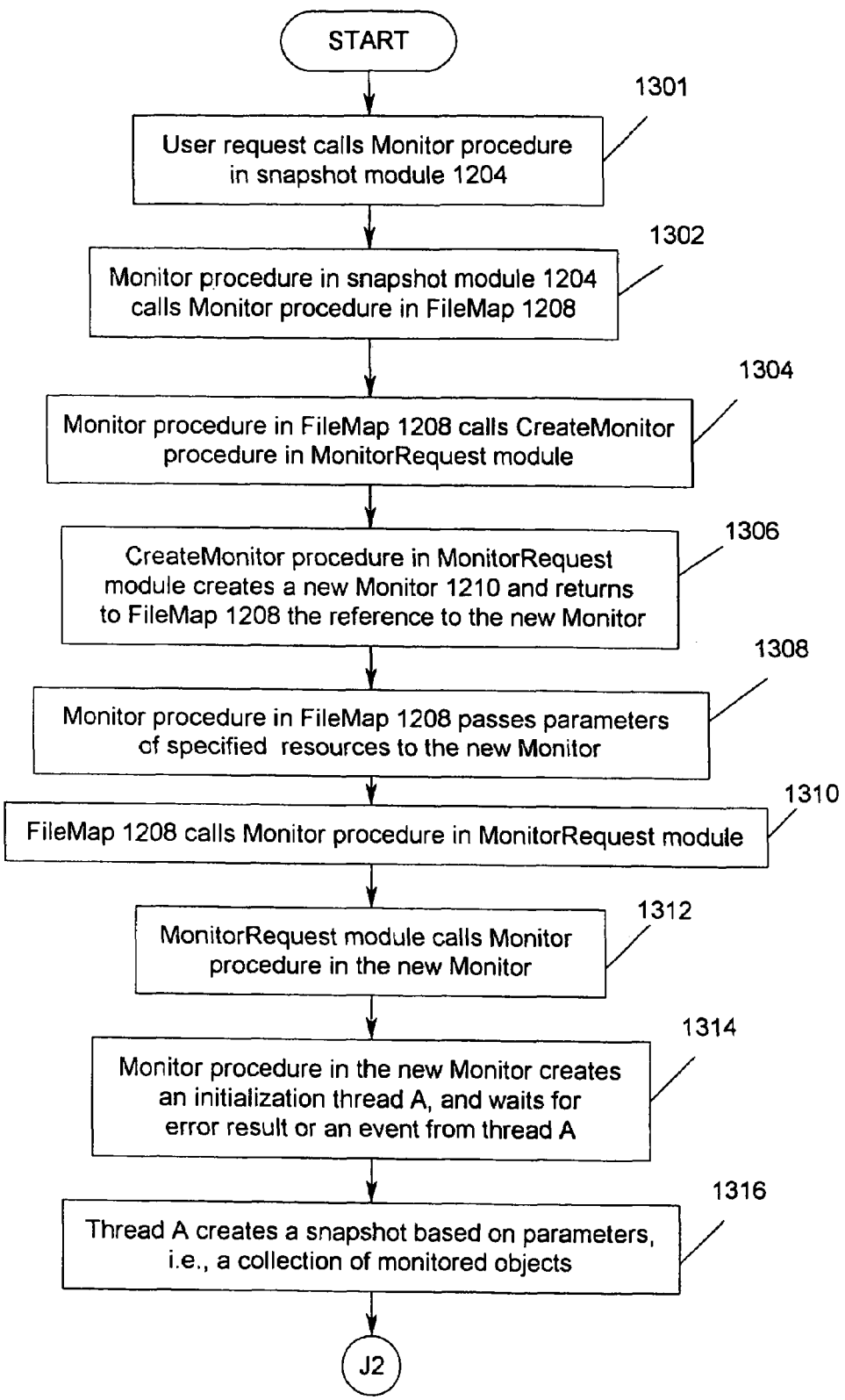
FIG. 13 is a flowchart illustrating an embodiment of the method to be practiced with the system 1200 of FIG. 12.
Figure 13B:
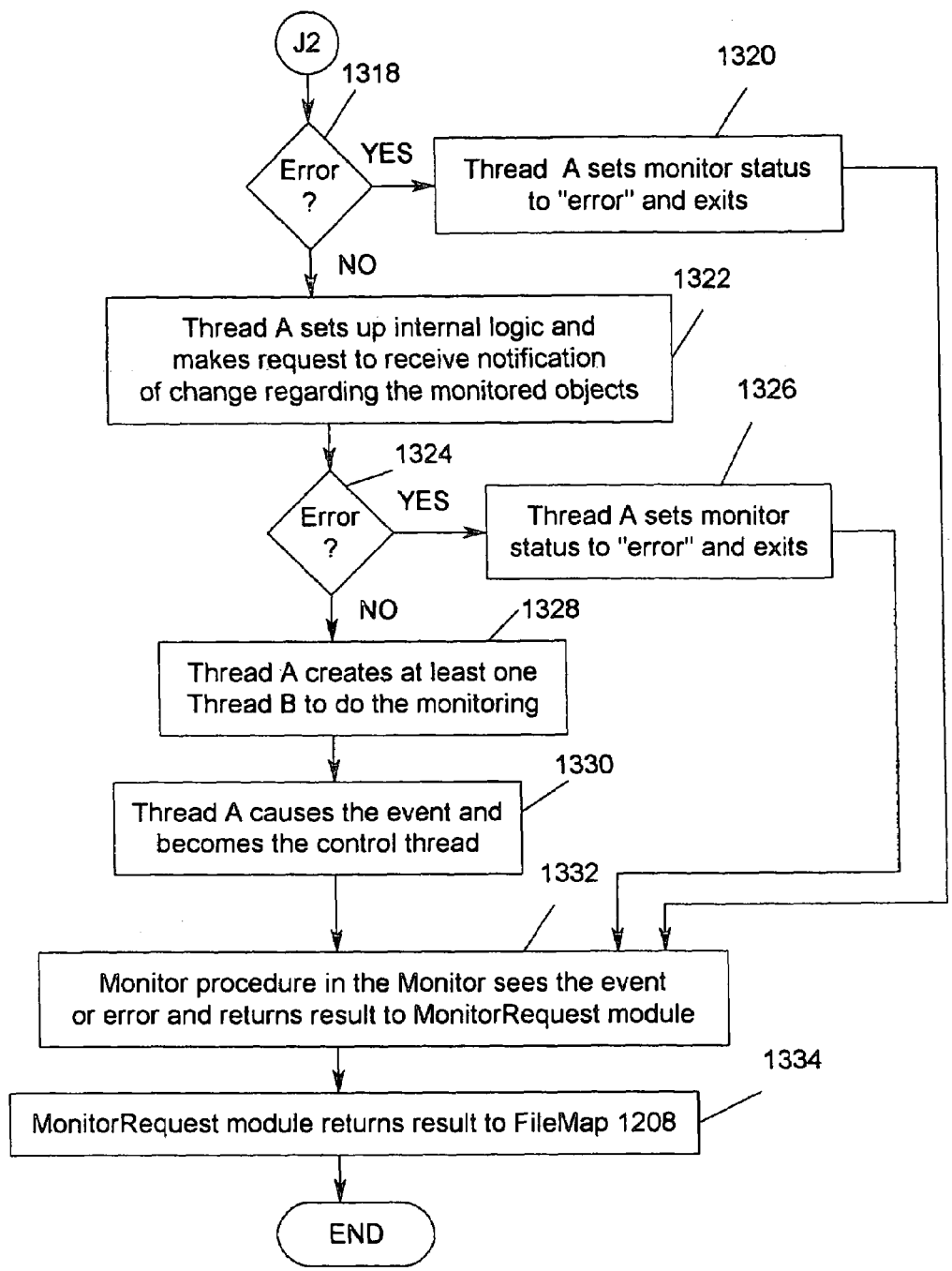

FIG. 13 is a flowchart illustrating an embodiment of the method to be practiced with the system 1200 of FIG. 12. For clarity reasons, the flowchart pertains to the case where the monitored objects are file objects.

The user request calls the Monitor procedure in the Snapshot module 1204 and passes the parameters of the specified resources (block 1301). The Monitor procedure in the Snapshot module 1204 calls the Monitor procedure in FileMap 1208 (block 1302). The Monitor procedure in FileMap 1208 then calls the CreateMonitor procedure in MonitorRequest module 1212 (block 1304). The CreateMonitor procedure in MonitorRequest module creates a Monitor 1214 (which is just an object having no attributes of the specified resources at this point), and returns to FileMap 1208 the reference to the newly created Monitor 1214 (block 1306). The Monitor procedure in FileMap 1208 transfers all parameters of specified resources to the new Monitor 1214 (block 1308). FileMap 1208 calls the Monitor procedure in MonitorRequest module 1212 (block 1310), which then calls the Monitor procedure in the new Monitor 1214 (block 1312).

The Monitor procedure in the new Monitor 1214 creates an initialization thread A, and waits for error result or event from initialization thread A (block 1314). An event indicates successful initialization of the Monitor 1214. An error result indicates an error encountered during the initialization of the Monitor 1214.

Thread A creates a snapshot of specified resources based on the parameters already received from the FileMap 1208. In other words, thread A creates a collection of monitored objects corresponding to the specified resources (block 1316).

If there is an error in creating the snapshot (block 1318), thread A sets the currently created monitor status to "error", and exits (block 1320).

If there is no error in creating the snapshot, thread A sets up internal logic and makes request to receive notification of change regarding the monitored objects from the operating system (block 1322). If there is any error at this point (block 1324), thread A sets Monitor status to "error" and exits (block 1326). For example, an error is encountered if a specified resource is already being monitored by an existing active monitor created prior to the new monitor. If there is no error, thread A creates at least one thread B to do the monitoring (block 1328). Depending on the type of monitor and the number of monitored objects, more than one thread B may be needed. The monitoring function of thread B in this embodiment is the same as the one discussed in FIG. 4C and FIG. 4D for the first embodiment of the Resource Monitor.

After creating thread B (block 1328), thread A causes the event indicating completion of the initialization of the Monitor, then thread A becomes the control thread for the Monitor 1214 (block 1330). By becoming the control thread for the Monitor 1214, thread A allows the user to have control of the Monitor 1214 via a user request to the Monitor 1214. User requests include "Stop" to stop the Monitor 1214 from monitoring, "Start" to restart the Monitor 1214, and "Quit" to terminate the Monitor 1214.

The Monitor procedure in the Monitor 1214 sees the event caused by thread A (in block 1330) or the monitor status "error" set by thread A (in block 1320 or block 1326) and returns result to MonitorRequest module 1212 (block 1332). MonitorRequest module returns result to the FileMap 1208 (block 1334).

Thread B, created by thread A (FIG. 13, block 1328) does the monitoring, which includes waiting for notification of any changes to the monitored objects. The monitored objects associated with one Monitor may be files or registry key values, but not both. If there are both types of monitored objects in one user request, then two different Monitors 1214$_1$, 1214$_2$ are created to separately monitor each type of monitored objects. In other words, one Monitor 1214$_1$ would monitor the file objects, while the other Monitor 1214$_2$ would monitor the registry objects. It is noted that each Monitor 1214$_i$ includes procedures, i.e., program code, to handle either type of monitored objects, but for efficiency reasons, can only maintain a collection of monitored objects of the same type.

The monitoring function of thread B in this second embodiment is the same as the one discussed in reference to FIG. 4C and FIG. 4D for the first embodiment of the Resource Monitor.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method for dynamically monitoring resources, the method comprising the operations of:
    (a) receiving at a snapshot module a request from a user to monitor a set of specified resources;
    (b) requesting, via the snapshot module, a monitor request module to create at least one monitor;
    (c) creating at least one monitor using the monitor request module;
    (d) loading into the monitor parameters of the specified resources;
    (e) creating a set of first objects corresponding to a snapshot of the specified resources based on the loaded parameters, the snapshot representing states of the specified resources at a point in time; and
    (f) monitoring the first objects using the monitor;
    wherein the specified resources include at least one of the following: a file object, a registry object, and a set of all processes that are active while the monitor is active.

2. The method of claim 1 further comprising:
    (g) providing to the user a link to the monitor.

3. The method of claim 1 wherein operation (e) comprises:
    creating an instantiation of the snapshot module.

4. The method of claim 1 further comprising:
    (g) updating the set of first objects upon receiving a notification of a change to at least one of the specified resources, using the monitor; and
    (h) logging information related to the change.

5. The method of claim 4 further comprising:
    (i) creating a new object representing a current state of the specified resource having the change; and
    (j) comparing the new object to the corresponding first object representing a previous state of the specified resource to determine the change.

6. The method of claim 1 wherein the specified resources are of different types, and wherein operation (c) comprises:
    creating different monitors to correspond to the different types of specified resources;
    and wherein operation (e) comprises:
    creating different sets of first objects corresponding to the different types of specified resources, each of the different sets of first objects representing states of specified resources of a corresponding type and being maintained by a corresponding monitor.

7. The method of claim 6 further comprising:
    providing to the user a link to each of the monitors.

8. The method of claim 1 wherein the monitor is implemented as one of a COM object, a thread, and a process.

9. The method of claim 1 wherein the monitor request module is initiated by a resource monitor service.

10. The method of claim 9 wherein, after being initiated, the monitor request module restarts all restartable monitors.

11. The method of claim 1 further comprising:
    determining, using the monitor request module, whether the specified resources are already being monitored by an active monitor previously created; and
    if the specified resources are already being monitored by an active monitor previously created, setting the currently created monitor to error status using the monitor request module.

12. An article of manufacture comprising:
    a machine-accessible storage medium including data that, when accessed by a machine, causes the machine to perform operations comprising:
    (a) receiving at a snapshot module a request from a user to monitor a set of specified resources;
    (b) requesting, via the snapshot module, a monitor request module to create at least one monitor;
    (c) creating at least one monitor using the monitor request module;
    (d) loading into the monitor parameters of the specified resources;
    (e) creating a set of first objects corresponding to a snapshot of the specified resources based on the loaded parameters, the snapshot representing states of the specified resources at a point in time; and
    (f) monitoring the first objects using the monitor;
    wherein the specified resources include at least one of the following: a file object, a registry object, and a set of all processes that are active while the monitor is active.

13. The article of manufacture of claim 12 wherein the operations further comprise:
    (g) providing to the user a link to the monitor.

14. The article of manufacture of claim 12 wherein operation (e) comprises:
    creating an instantiation of the snapshot module.

15. The article of manufacture of claim 12 wherein the operations further comprise:
    (g) updating the set of first objects upon receiving a notification of a change to at least one of the specified resources, using the monitor; and
    (h) logging information related to the change.

16. The article of manufacture of claim 15 wherein the operations further comprise:
    (i) creating a new object representing a current state of the specified resource having the change; and (j) comparing the new object to the corresponding first object representing a previous state of the specified resource to determine the change.

17. The article of manufacture of claim 12 wherein the specified resources are of different types, and wherein operation (c) comprises:
creating different monitors to correspond to the different types of specified resources;
and wherein operation (e) comprises:
creating different sets of first objects corresponding to the different types of specified resources, each of the different sets of first objects representing states of specified resources of a corresponding type and being maintained by a corresponding monitor.

18. The article of manufacture of claim 17 wherein the operations further comprise:
providing to the user a link to each of the monitors.

19. The article of manufacture of claim 12 wherein the monitor is implemented as one of a COM object, a thread, and a process.

20. The article of manufacture of claim 12 wherein the operations further comprise:
initiating the monitor request module using a resource monitor service.

21. The article of manufacture of claim 20 wherein the operations further comprise:
restarting all restartable monitors using the monitor request module.

22. The article of manufacture of claim 12 wherein the operations further comprise:
determining, using the monitor request module, whether the specified resource is already being monitored by an active monitor previously created; and
if the specified resource is already being monitored by an active monitor previously created, setting the currently created monitor to error status using the monitor request module.

23. A system comprising:
a processor; and
a memory coupled to the processor, the memory containing program code that, when executed by the processor, causes the processor to perform operations comprising:
(a) receiving at a snapshot module a request from a user to monitor a set of specified resources;
(b) requesting, via the snapshot module, a monitor request module to create at least one monitor;
(c) creating at least one monitor using the monitor request module;
(d) loading into the monitor parameters of the specified resources;
(e) creating a set of first objects corresponding to a snapshot of the specified resources based on the loaded parameters, the snapshot representing states of the specified resources at a point in time; and
(f) monitoring the first objects using the monitor;
wherein the specified resources include at least one of the following: a file object, a registry object, and a set of all processes that are active while the monitor is active.

24. The system of claim 23 wherein the operations further comprise:
(g) providing to the user a link to the monitor.

25. The system of claim 23 wherein operation (e) comprises:
creating an instantiation of the snapshot module.

26. The system of claim 23 wherein the operations further comprise:
(g) updating the set of first objects upon receiving a notification of a change to at least one of the specified resources, using the monitor; and
(h) logging information related to the change.

27. The system of claim 26 wherein the operations further comprise:
(i) creating a new object representing a current state of the specified resource having the change; and
(j) comparing the new object to the corresponding first object representing a previous state of the specified resource to determine the change.

28. The system of claim 23 wherein the specified resources are of different types, and wherein operation (c) comprises:
creating different monitors to correspond to the different types of specified resources;
and wherein operation (e) comprises:
creating different sets of first objects corresponding to the different types of specified resources, each of the different sets of first objects representing states of specified resources of a corresponding type and being maintained by a corresponding monitor.

29. The system of claim 28 wherein the operations further comprise:
providing to the user a link to each of the monitors.

30. The system of claim 23 wherein the monitor is implemented as one of a COM object, a thread, and a process.

31. The system of claim 23 wherein the operations further comprise:
initiating the monitor request module using a resource monitor service.

32. The system of claim 31 wherein the operations further comprise:
restarting all restartable monitors using the monitor request module.

33. The system of claim 23 wherein the operations further comprise:
determining, using the monitor request module, whether the specified resource is already being monitored by an active monitor previously created; and
if the specified resource is already being monitored by an active monitor previously created, setting the currently created monitor to error status using the monitor request module.

* * * * *